(12) United States Patent
Yaoita

(10) Patent No.: US 8,286,597 B2
(45) Date of Patent: Oct. 16, 2012

(54) ENGINE WITH A SLIDABLE VALVE

(76) Inventor: Yasuhito Yaoita, Oota-ku (JP)

( * ) Notice: Subject to any disclaimer, the term of this patent is extended or adjusted under 35 U.S.C. 154(b) by 694 days.

(21) Appl. No.: 12/391,309

(22) Filed: Feb. 24, 2009

(65) Prior Publication Data

US 2009/0272357 A1    Nov. 5, 2009

(30) Foreign Application Priority Data

May 4, 2008    (JP) .............................. A2008-120801

(51) Int. Cl.
   *F02B 75/04*    (2006.01)
(52) U.S. Cl. ................. 123/48 R; 123/188.4; 123/81 R; 123/81 B
(58) Field of Classification Search .............. 123/81 R, 123/81 B, 188.4, 79 R, 311, 79 C, 190.14, 123/190.15, 81 D, 48 R
   See application file for complete search history.

(56) References Cited

U.S. PATENT DOCUMENTS

| | | | | | |
|---|---|---|---|---|---|
| 1,510,651 | A | * | 10/1924 | Burtnett ...................... | 123/79 R |
| 2,160,000 | A | * | 5/1939 | Rhein ......................... | 123/188.4 |
| 3,895,614 | A | * | 7/1975 | Bailey ......................... | 123/67 |
| 3,924,576 | A | * | 12/1975 | Siewert ......................... | 123/1 R |
| 4,023,539 | A | * | 5/1977 | Noguchi et al. .................. | 123/3 |
| 4,200,213 | A | * | 4/1980 | Liesse ............................ | 227/10 |
| 4,377,991 | A | * | 3/1983 | Liesse ........................ | 123/46 SC |
| 4,788,945 | A | * | 12/1988 | Negre ....................... | 123/80 BA |
| 4,791,895 | A | * | 12/1988 | Tittizer ....................... | 123/90.12 |
| 7,290,509 | B2 | * | 11/2007 | Lou ............................. | 123/90.12 |

FOREIGN PATENT DOCUMENTS

| | | |
|---|---|---|
| JP | A1987-038835 | 2/1987 |
| JP | U1987-028006 | 2/1987 |
| JP | U1988-060038 | 4/1988 |
| JP | A1993-256168 | 10/1993 |
| JP | A1993-280384 | 10/1993 |
| JP | U1993-078945 | 10/1993 |
| JP | A1995-279670 | 10/1995 |
| JP | A1995-310551 | 11/1995 |
| JP | A1999-166431 | 6/1999 |
| JP | A2005-030235 | 2/2000 |
| JP | A2000-282814 | 10/2000 |
| JP | A2001-207851 | 8/2001 |
| JP | A2002-317702 | 10/2002 |
| JP | A2003-293805 | 10/2003 |

* cited by examiner

*Primary Examiner* — Noah Kamen
*Assistant Examiner* — Long T Tran

(57) ABSTRACT

An engine has an auxiliary cylinder 2 and a valve body 6 slidable in this cylinder. The valve body 6 has a gas space 7 formed in it. The engine further has an actuator for shifting the valve body 6 to switch the communication between the main combustion chamber and the gas space 7 and the isolation of the chamber and cavity from each other. The slidable valve may function as a compression ratio changer, which switches the communication and the isolation according to the load on the piston. In this case, the engine has a third compression ring 18. The slidable valve may also function as a suction or exhaust valve, which switches the communication between the combustion chamber and auxiliary passage and the isolation of the chamber and passage from each other during the suction or exhaust strokes. This improves the suction or exhaust efficiency of the engine.

9 Claims, 29 Drawing Sheets

Engine Performance Curve

ENGINE WITH A SLIDABLE VALVE

BACKGROUND OF THE INVENTION

1. Field of the Invention

The present invention relates to an engine having an auxiliary cylinder and a valve slidable in this cylinder. The invention also relates to a method for operating the engine.

2. Description of the Related Art

FIG. 24 shows the variable compression ratio engine disclosed in JP 2005-30235 A. The connecting rod 13 of this engine includes an upper part 16 and a lower part 17, which are connected by a joint 18. The joint 18 is connected to a control rod 21. The engine has a mechanism for shifting the control rod 21 to vary the distance between the ends of the connecting rod 13. Combustion gas pressure is exerted on the joint 18 and the shifting mechanism. This pressure is high when the piston is under a heavy load. This causes problems with the durability of the joint 18 and the shifting mechanism.

FIG. 25 shows an engine in which combustion gas pressure is exerted on the movable member 4 in the auxiliary chamber. FIG. 26 shows an engine in which combustion gas pressure is exerted on the auxiliary piston 9. In each of these engines, the mechanism for changing the volume of the combustion chamber moves against the combustion gas pressure. This causes a problem with the durability of the changing mechanism.

FIG. 27 shows the engine shown in FIG. 3.248 on page 237 of "History of Internal Combustion Engines" published by San-ei Shobo of Shinjuku, Tokyo. The piston of this engine reciprocates in a double sleeve. The cylinder head of this engine has outer peripheral grooves, in which piston rings are fitted. The piston rings are in contact with the inner cylindrical surface of the double sleeve. If overhead poppet valves were fitted inside the double sleeve, the peripheral grooves would restrict the area where the valves could be fitted. This would decrease the suction efficiency and exhaust efficiency of the poppet valves.

The suction resistance and exhaust resistance of a four cycle engine are high when it rotates at high speed. The suction lifts in this engine are extremely small in the initial stages of the periods when the suction valve is open. The initial stages are shorter when the engine rotates at a higher speed. This restricts the inflow of suction gas. As a result, in the initial stages of the periods when the suction valve is open, the pressure in the cylinder is lower than the pressure at the back of the piston. Under this condition, the piston keeps moving downward against the pressure on it. As a result, the negative work increases. This increases the loss caused by the suction resistance, so that the torque lowers.

FIG. 28 shows the engine performance curves shown on page 90 of No. 434 issued in November, 1995 of a magazine entitled "Internal Combustion Engine" published by Sankaido. With reference to FIG. 28, the torque of a four cycle engine is lower than the maximum torque points L1 and L2 on torque curves when the engines rotate at speeds higher than those for these points.

The exhaust lifts in a four cycle engine are extremely smaller in the initial stage of the period when the exhaust valve is open until the piston reaches the bottom dead point of each exhaust stroke than in the middle stage of this period. Consequently, when the engine rotates at high speed, the pressure created in the cylinder when the piston is at the bottom dead point is high. As a result, just after the piston leaves the bottom dead point, the exhaust resistance causes a great loss.

FIG. 29 shows the side valve engine disclosed in JP 2000-282814 A. The main combustion chamber 54 of this engine has an extension outside the cylinder. This makes it possible to fit another suction valve and another exhaust valve that face the top of the piston. The space between the suction and exhaust valves is narrowed to make the combustion chamber compact.

However, the volume of the main combustion chamber 54 is increased by the space between the wall fitted with a side valve and the surface facing the wall. The volume of this space increases with the lift of the side valve. Consequently, the combustion chamber having a suction valve facing the top of the piston and a side valve cannot have a high combustion ratio, so that the engine efficiency is low.

If the strokes of the piston are longer than its diameter, the combustion gas conversion efficiency is high, but the suction efficiency is low when the engine rotates at high speed. The low suction efficiency leads to low torque. If the piston strokes are shorter than the piston diameter, the suction efficiency is high when the engine rotates at high speed, but the combustion gas conversion efficiency is low.

Therefore, long strokes of the pistons of conventional spark ignition engines have been incompatible with torque increases that may be caused when the engines rotate at high speed.

SUMMARY OF THE INVENTION

A first object of the present invention is to provide a piston engine having a durable selector valve, which the pressure of the combustion gas in the combustion chamber of the engine affects.

A second object of the present invention is to provide a piston engine having an improved thermal efficiency when the piston of the engine is under low loads.

A third object of the present invention is to provide a piston engine having both a low suction resistance and a high compression ratio while the engine is rotating at a high speed.

A piston engine according to a first aspect of the present invention includes a cylinder head, a cylinder block, a main cylinder, a piston, an auxiliary cylinder, and a cylindrical valve body. The piston slides in the main cylinder, which is fitted in the cylinder block. A main combustion chamber is formed between the piston and the cylinder head. The auxiliary cylinder is fitted outside the main cylinder and has an opening communicating with the combustion chamber. The valve body slides in the auxiliary cylinder axially of this cylinder. The valve body is fitted with a first compression ring and a second compression ring around it. The valve body has a gas space formed in it. The gas space has a port formed on the cylindrical side surface of the valve body. The port is adjacent to the cylinder opening and positioned outside the cylindrical side surface of the valve body between the compression rings. The cylinder opening is smaller than the cylindrical side surface between the rings axially of the auxiliary cylinder.

The engine further includes an actuator for shifting the valve body axially of the auxiliary cylinder. When the cylindrical side surface between the compression rings is positioned at the cylinder opening, the combustion chamber and the gas space are isolated from each other. When the port of the gas space is aligned with the cylinder opening, the combustion chamber and the gas space communicate with each other.

The valve body, the two compression rings, the gas space, and the actuator are the elements of a slidable valve, which functions as a selector valve for switching the communication between the combustion chamber and the gas space and the isolation of the chamber and this space from each other.

The first aspect is common to a second aspect and a third aspect of the present invention.

When the cylindrical side surface between the compression rings is positioned at the cylinder opening, the pressure of the combustion gas in the combustion chamber is not applied on the actuator and the valve body axially of the auxiliary cylinder. This prevents the durability of the actuator from decreasing. Therefore, the first aspect can achieve part of the first object. The conditions for perfectly achieving the first object will be explained together with the durability of the actuator of the engine shown in FIG. 1 of the accompanying drawings.

A piston engine according to the second aspect includes, in addition to the elements of the engine according to the first aspect, the following elements.

The valve body of the engine according to the second aspect is further fitted with a third compression ring around it. The first compression ring is positioned between the second and third compression rings. The port of the gas space of this engine is positioned between the first and third compression rings. The opening of the auxiliary cylinder of this engine is smaller axially of this cylinder than the distance between the first and third compression rings.

The actuator of this engine shifts the slidable valve axially of the auxiliary cylinder according to the change in the load on the piston. When the cylindrical side surface between the first and second compression rings is positioned at the cylinder opening, the first compression ring isolates the combustion chamber and the gas space from each other so as to raise the compression ratio in the chamber. When the port of the gas space is aligned with the cylinder opening, the combustion chamber and the gas space communicate with each other so as to lower the compression ratio.

The foregoing elements of the engine according to the second aspect are the differences between the engines according to the first and second aspects.

In the engine according to the second aspect, the gas space functions as an auxiliary combustion chamber when the piston is under a heavy load. The slidable valve of this engine functions as a mechanism for changing the volume of the main combustion chamber.

This engine makes it possible to raise the compression ratio when the piston is under a light load. This improves the thermal efficiency of the engine. Therefore, the second aspect can achieve the second object of the present invention.

A piston engine according to the third aspect includes, in addition to the elements of the engine according to the first aspect, the following elements.

The engine according to the third aspect has an overhead poppet valve and an auxiliary passage for suction or exhaust gas. The passage communicates with the outside of the engine. The gas space of this engine further has a second port formed outside the cylindrical side surface between the two compression rings.

The actuator of this engine shifts the slidable valve axially of the auxiliary cylinder in synchronism with all strokes of the piston. When the cylindrical side surface between the two compression rings is positioned at the opening of the auxiliary cylinder, the combustion chamber and the auxiliary passage are isolated from each other. When the first-mentioned port of the gas space is aligned with the cylinder opening, the combustion chamber and the passage communicate with each other through this space during the suction or exhaust strokes of the piston.

The foregoing elements of the engine according to the third aspect are the differences between the engines according to the first and third aspects.

The slidable valve of this engine switches, through the gas space, the communication between the combustion chamber and the auxiliary passage and the isolation of the chamber and the passage from each other.

The sum of the area of the poppet valve and the area of the suction or exhaust port of the slidable valve is larger than that in the combustion chamber of an engine fitted with no additional suction and exhaust valves outside the main cylinder. This reduces the suction and exhaust resistances while the engine is rotating at a high speed.

During the compression and combustion strokes of the piston of this engine, the combustion chamber and the gas space are isolated from each other. As a result, during the combustion strokes, the compression ratio in the combustion chamber decreases very little. This makes it possible to realize a combustion chamber higher in compression ratio than that of the side valve engine.

Therefore, the third aspect can achieve the third object of the present invention.

DETAILED DESCRIPTION OF PREFERRED EMBODIMENTS

FIGS. 1-5 show engines according to basic embodiments of the present invention, which correspond to the first aspect of the invention. These engines have many elements common to the engines shown in FIGS. 6-23. Therefore, with regard to the engines shown in FIGS. 6-23, only the differences between these engines and the engines shown in FIGS. 1-5 will be described.

Figure 1:
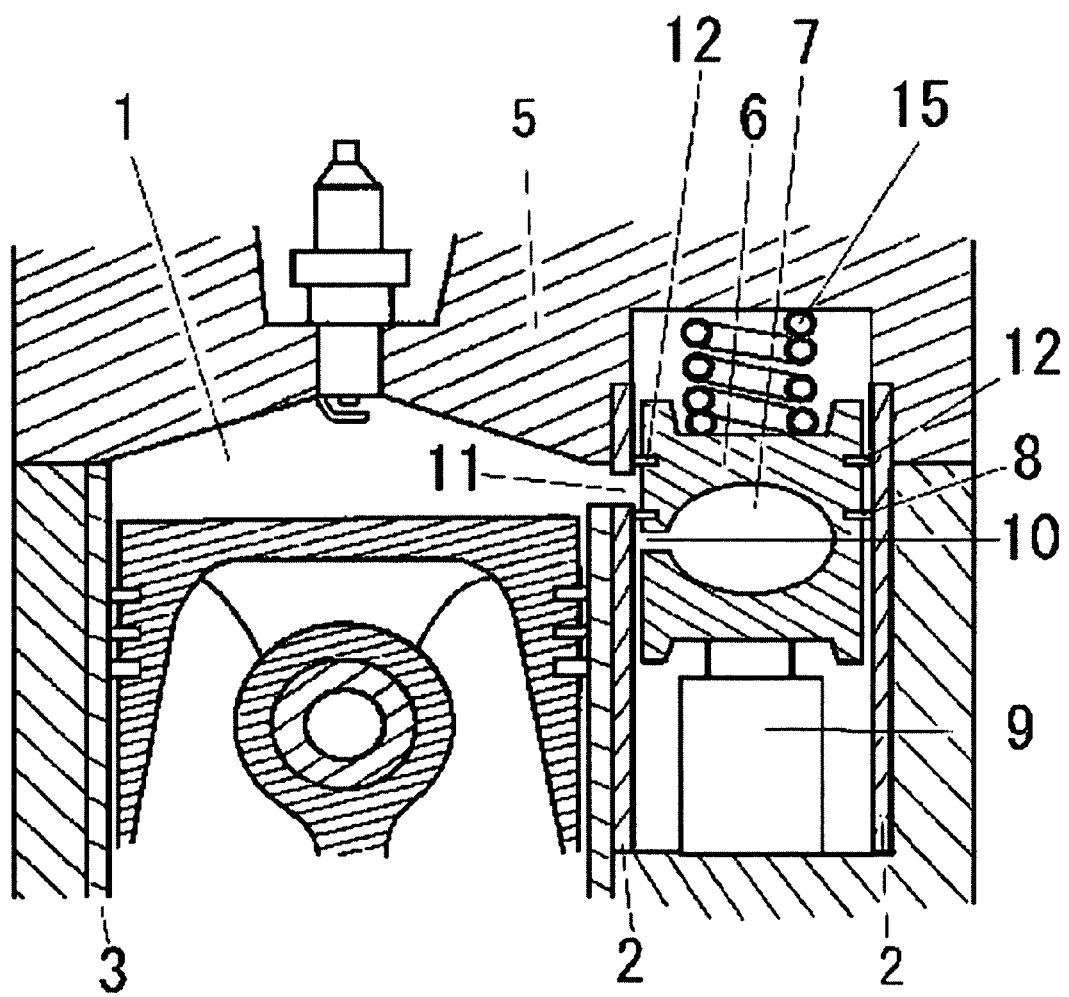
FIGS. 1-5 are sectional views of engines according to basic embodiments of the present invention, which correspond to the first aspect of the invention.

With reference to FIG. 1, an engine includes a cylinder head 5, a cylinder block, a main cylinder 3, a main piston, and an auxiliary cylinder 2. The cylinder head 5 is fitted with an ignition plug. The main cylinder 3 is fitted in the cylinder block. A main combustion chamber 1 is formed between the cylinder head 5 and the main piston. The ignition plug is exposed to the main combustion chamber 1.

The auxiliary cylinder 2 is fitted outside the main cylinder 3 in the cylinder block and the cylinder head 5. The auxiliary cylinder 2 has an opening 11 formed through its wall. The cylinder opening 11 communicates with the main combustion chamber 1.

A valve body 6 slides in the auxiliary cylinder 2 axially of this cylinder. The valve body 6 is fitted with a first compression ring 8 and a second compression ring 12 around it. The valve body 6 has a gas space 7 formed in it, which has a port 10 formed on the cylindrical side surface of the valve body 6. The port 10 of the gas space 7 is adjacent to the cylinder opening 11 and positioned outside the cylindrical side surface between the rings 8 and 12. The cylinder opening 11 is smaller than the distance between the rings 8 and 12 axially of the auxiliary cylinder 2.

An actuator 9 shifts the valve body 6 axially of the auxiliary cylinder 2. The actuator 9 is similar to one of the actuators shown in FIGS. 6-18.

The operation of the actuator 9 will be described below.

The main combustion chamber 1 and the gas space 7 are isolated from each other when the actuator 9 shifts the valve body 6 to a position where the cylindrical side surface between the compression rings 8 and 12 is positioned at the cylinder opening 11. The main combustion chamber 1 and the gas space 7 communicate with each other when the actuator 9 shifts the valve body 6 to the position where the cavity port 10 is aligned with the cylinder opening 11. The actuator 9 shifts the valve body 6 between the two positions so as to switch the communication between the main combustion chamber 1 and the gas space 7 and the isolation of the chamber and cavity from each other.

Thus, the actuator 9 and valve body 6 function as a selector valve for switching the communication between the main combustion chamber 1 and the gas space 7 and the isolation of the chamber and the gas space from each other.

There is no need to fix the switching timing for the actuator 9. This does not affect the realization of the selector valve and the durability of the actuator 9.

The durability of the actuator 9 will be described below.

When the cylindrical side surface between the compression rings 8 and 12 is positioned at the cylinder opening 11, the rings seal the combustion gas in the main combustion chamber 1, keeping the gas from flowing into the auxiliary cylinder 2. This prevents the pressure of the combustion gas in the main combustion chamber 1 from being applied on the top of the valve body 6 and the actuator 9. When the cylindrical side surface between the rings 8 and 12 is positioned at the cylinder opening 11, the gas pressure exerts equal forces on the rings in opposite directions axially of the auxiliary cylinder 2. The equal forces are balanced.

Therefore, when the space between the compression rings 8 and 12 is positioned at the cylinder opening 11, the durability of the actuator 9 does not decrease. This is an advantage of the engine shown in FIG. 1. Therefore, when the cylindrical side surface between the rings 8 and 12 is positioned at the cylinder opening 11, this engine can achieve part of the first object of the present invention.

When the cylindrical side surface between the compression rings 8 and 12 is positioned at the cylinder opening 11, the pressure of the combustion gas acts on the cylindrical surface of the valve body 6 which faces the cylinder opening 11. As a result, the combustion gas presses the valve body 6 against the inner cylindrical surface of the auxiliary cylinder 2 away from the main combustion chamber 1. This may make the valve body 6 seize up if it is sliding. While the actuator 9 is not sliding the valve body 6, this body does not seize up, so that this engine can perfectly achieve the first object of the present invention.

This engine performs new functions and provides new advantages if the selector valve is given new limitations and new conditions, which include switching timing for the actuator 9. This will be explained with reference to the engines shown in FIGS. 6-18.

Other advantages of the engine shown in FIG. 1 will be explained below.

The valve body 6 does not restrict the areas of the poppet valves fitted at the wall of the main combustion chamber 1 which is higher than the main piston 31.

An annular space is defined between the compression rings 8 and 12, and between the cylindrical side surface of the valve body 6 and auxiliary cylinder 2. When the main combustion chamber 1 and gas space 7 are isolated from each other, this chamber communicates with the annular space. However, the annular space is so small in volume as to hardly reduce the compression ratio of the main combustion chamber 1.

The engine shown in FIG. 1 may be a two or four cycle piston engine, which may be a spark ignition engine or a compression ignition engine.

The valve body 6 does not convert the pressure of the combustion gas into output. In this respect, the valve body 6 differs from the pistons which convert the pressure of combustion gas into output.

The engines shown in FIGS. 2-5 are alternatives to the engine shown in FIG. 1.

Figure 2:
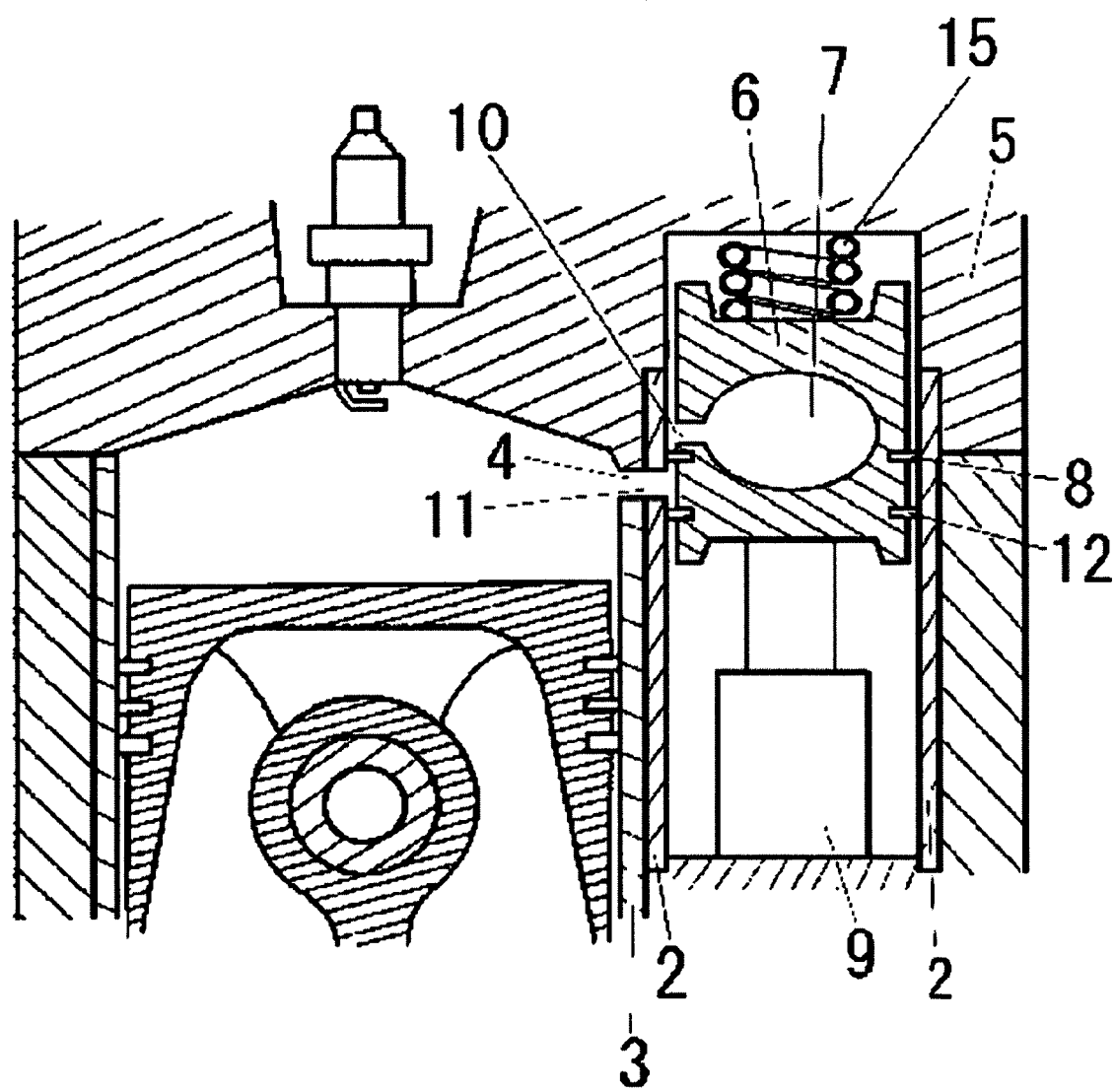

With reference to FIG. 2, a communicating passage 4 is formed between the main cylinder 3 and cylinder head 5. The communicating passage 4 connects the main combustion chamber 1 to the opening 11 of the auxiliary cylinder 2.

Figure 3:
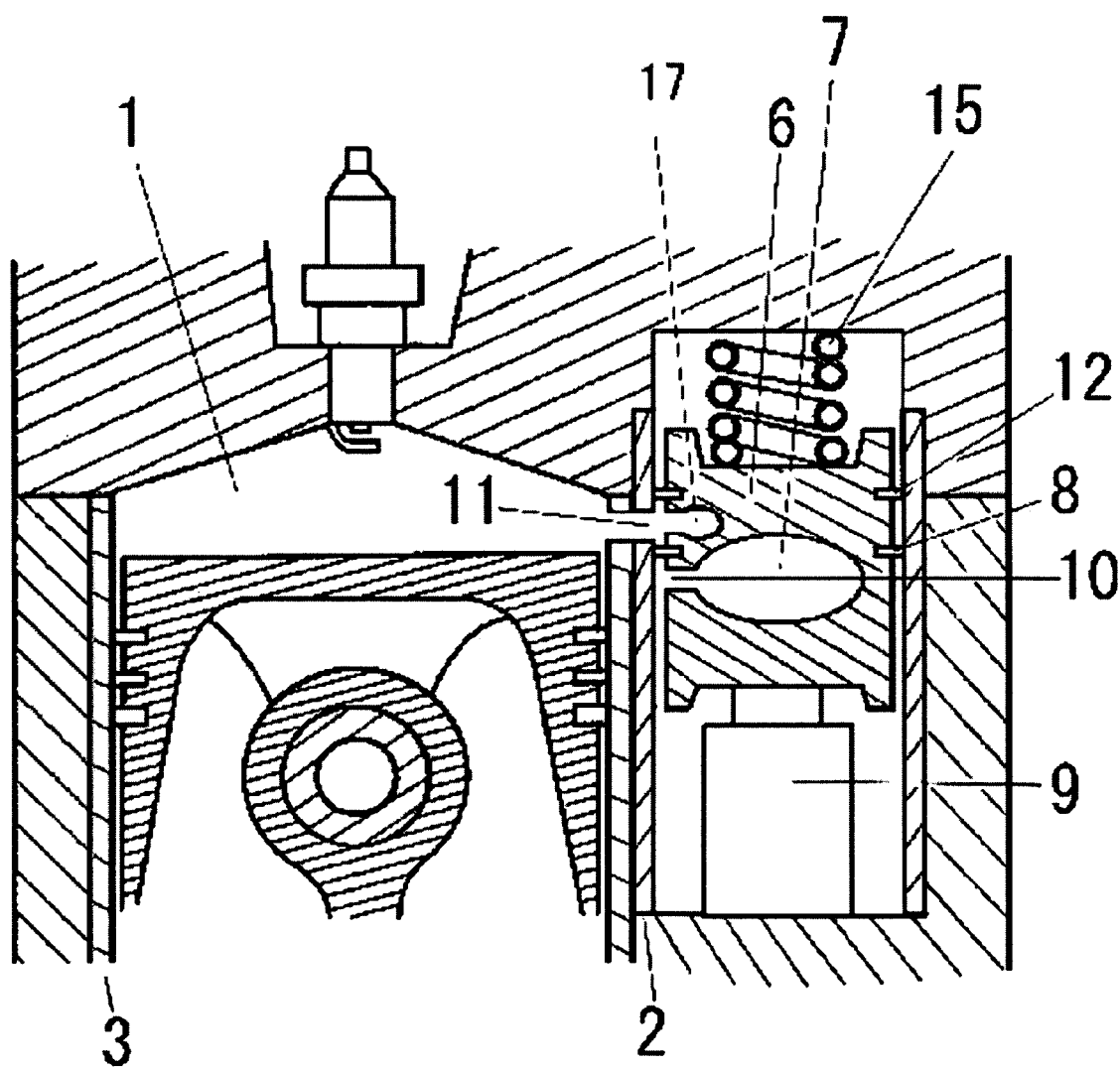

With reference to FIG. 3, the valve body 6 has concave 17, which is smaller than the gas space 7. The smaller concave 17 has a port formed on the cylindrical side surface of the valve body 6 between the compression rings 8 and 12.

Each of the valve bodies 6 shown in FIGS. 1-3 is cylindrical and has a gas space 7 formed in it.

Figure 4:
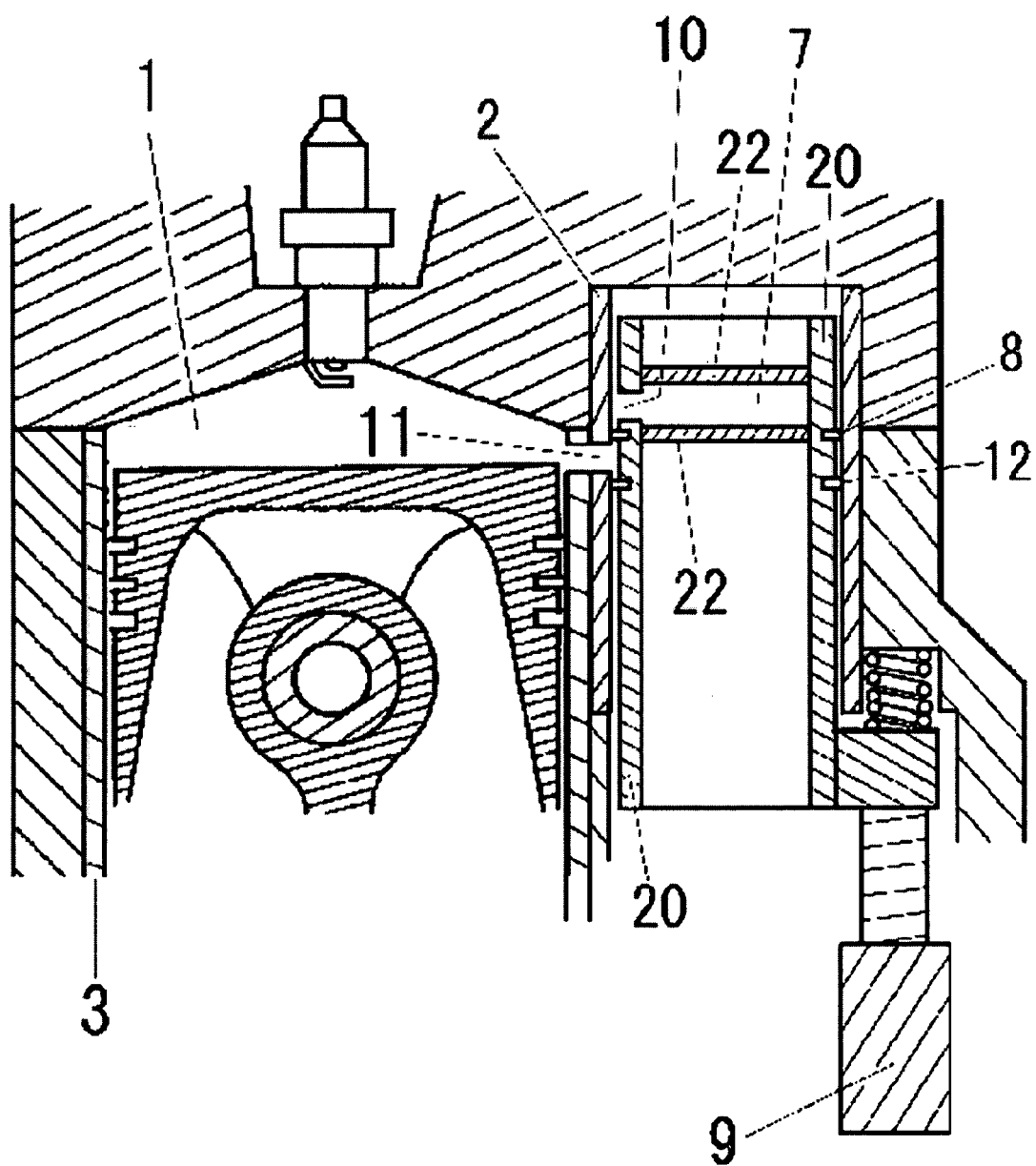

With reference to FIG. 4, a cylindrical sleeve 20 slides as a valve body in the auxiliary cylinder 2. The sleeve 20 has an opening 10 formed through its cylindrical wall and is fitted with a cross pipe 22 on its inner cylindrical surface. One end of the pipe 22 is closed by the auxiliary cylinder 2, and the other end is aligned with the sleeve opening 10, so that this opening communicates with the gas space 7 inside the pipe 22. The sleeve 20 is fitted with two compression rings 8 and 12 around it. The sleeve opening 10 is positioned outside the cylindrical side surface between the rings 8 and 12.

Figure 5:
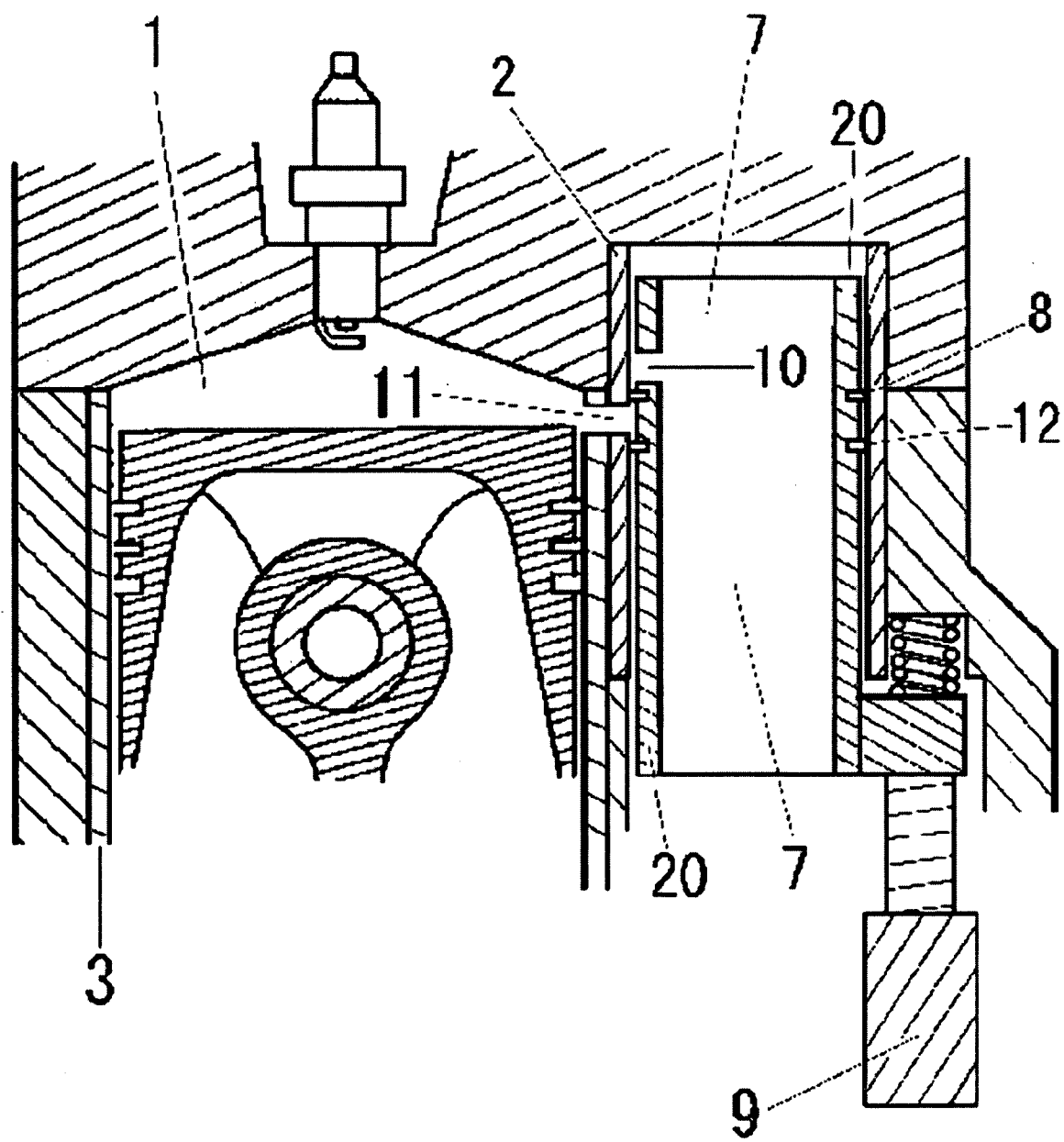

With reference to FIG. 5, a cylindrical sleeve 20 slides as a valve body in the auxiliary cylinder 2. The sleeve 20 has an opening 10 formed through its cylindrical wall. The sleeve 20 is fitted with two compression rings 8 and 12 around it. The sleeve opening 10 is positioned outside the cylindrical side surface between the rings 8 and 12. The gas space 7 inside the sleeve 20 can communicate with the opening 11 of the auxiliary cylinder 2 through the sleeve opening 10.

The engines shown in FIGS. 6-12 correspond to the second aspect of the present invention. Only the differences between these engines and the engines shown in FIGS. 1-5 will be described below.

Figure 6:
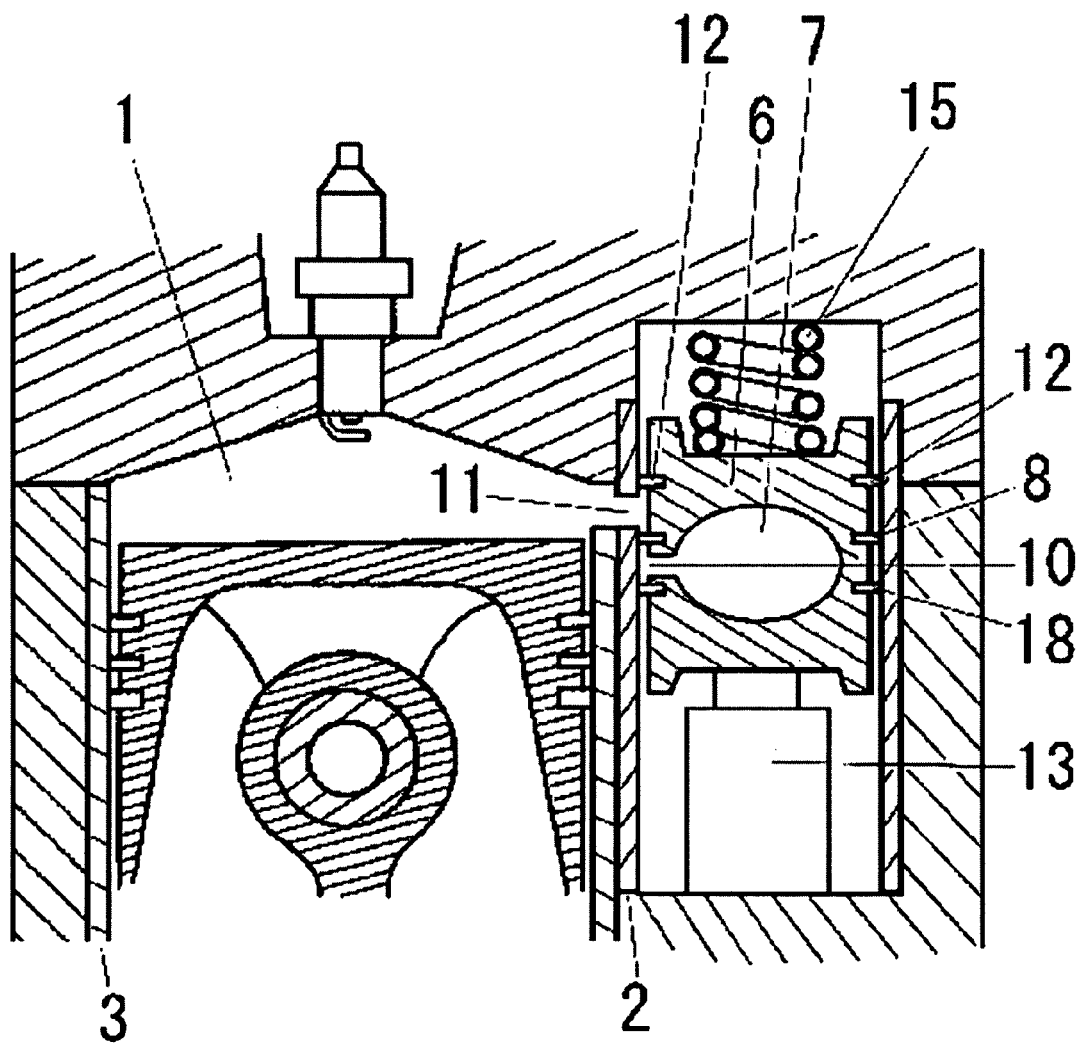
FIGS. 6-12 are sectional views of engines according to other embodiments of the present invention, which correspond to the second aspect of the invention.
Figure 7:
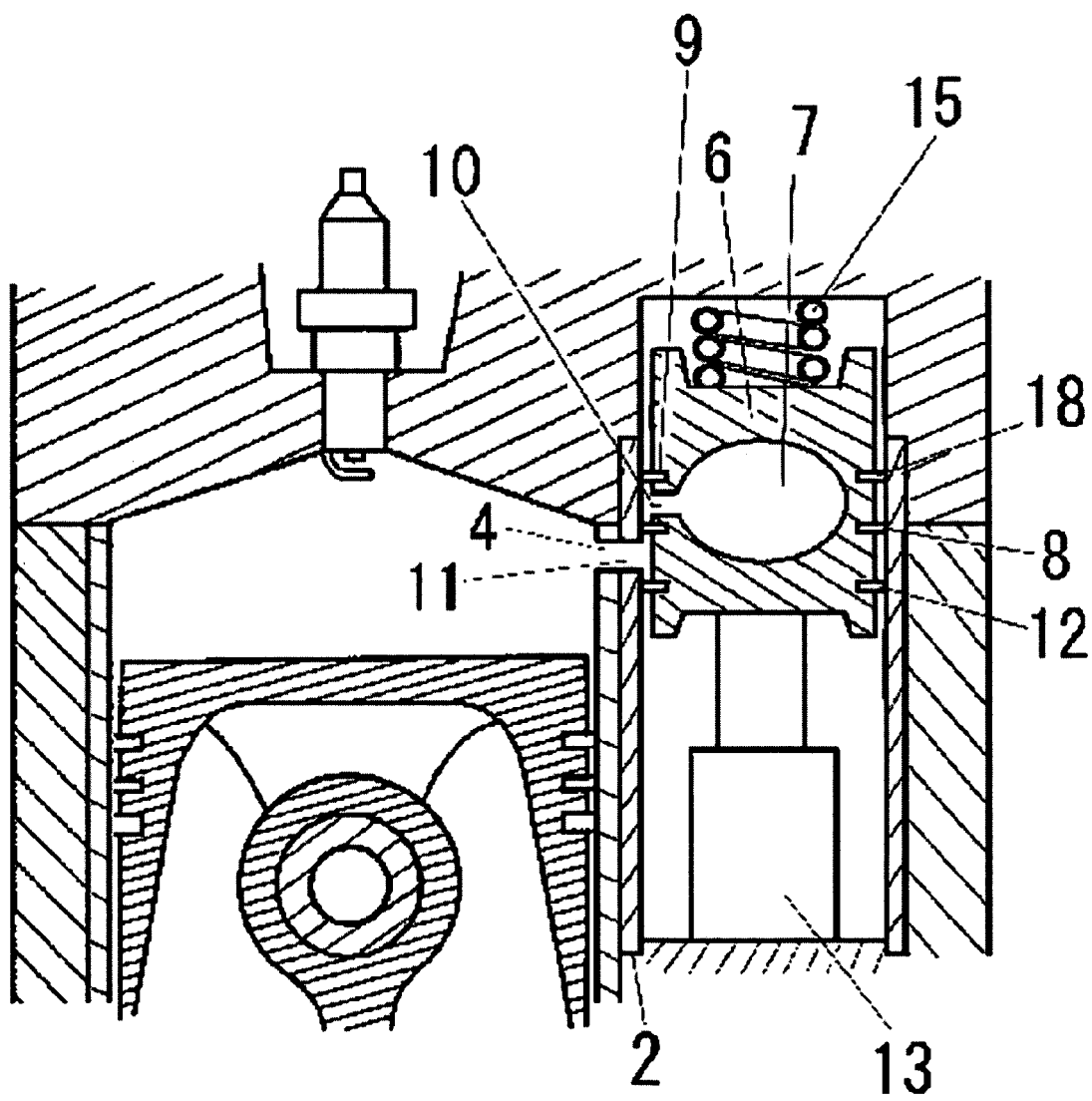

With reference to each of FIGS. 6 and 7, the valve body 6 is fitted with a third compression ring 18 in addition to the first and second compression rings 8 and 12 around the body. The first compression ring 8 is positioned between the other rings 12 and 18. The valve body 6 has a cavity 7 formed in it, which has a port 10 formed on the cylindrical side surface of the valve body 6. The cavity port 10 is adjacent to the main combustion chamber 1 and positioned between the rings 8 and 18. The opening 11 of the auxiliary cylinder 2 is smaller than the distance between the rings 8 and 18 axially of this cylinder.

An actuator 13 shifts the valve body 6 according to the change in the load on the piston. The actuator 13 may be pneumatic, hydraulic, electromagnetic, or electric. A compression spring 15 is fitted between the cylinder head and the adjacent end of the valve body 6. The compression spring 15 could be omitted if the actuator 13 were fitted with a spring in it.

When the valve body 6 is positioned as shown in FIG. 6 or 7, the compression ratio in the main combustion chamber 1 is high.

Figure 10:
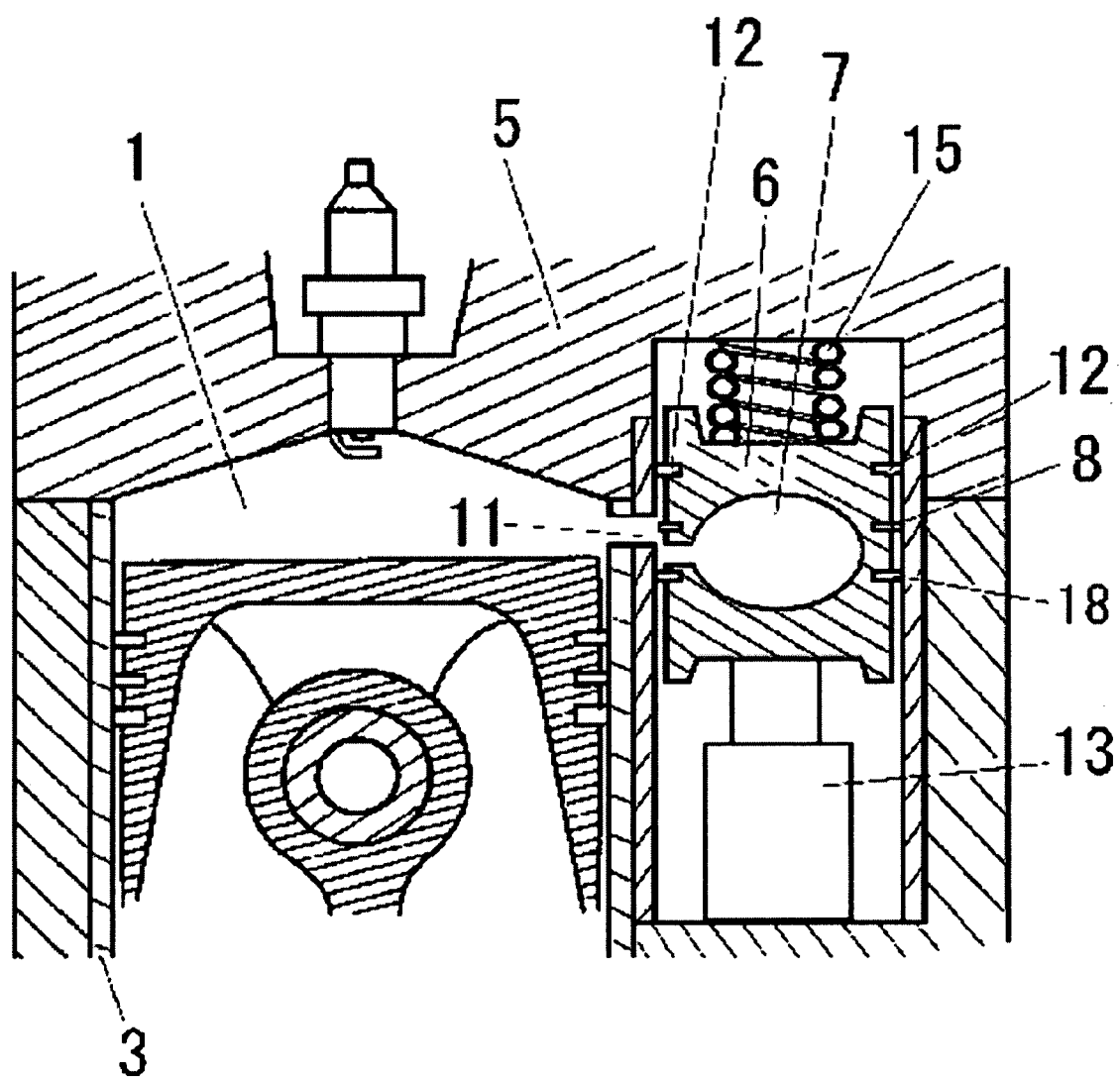
Figure 11:
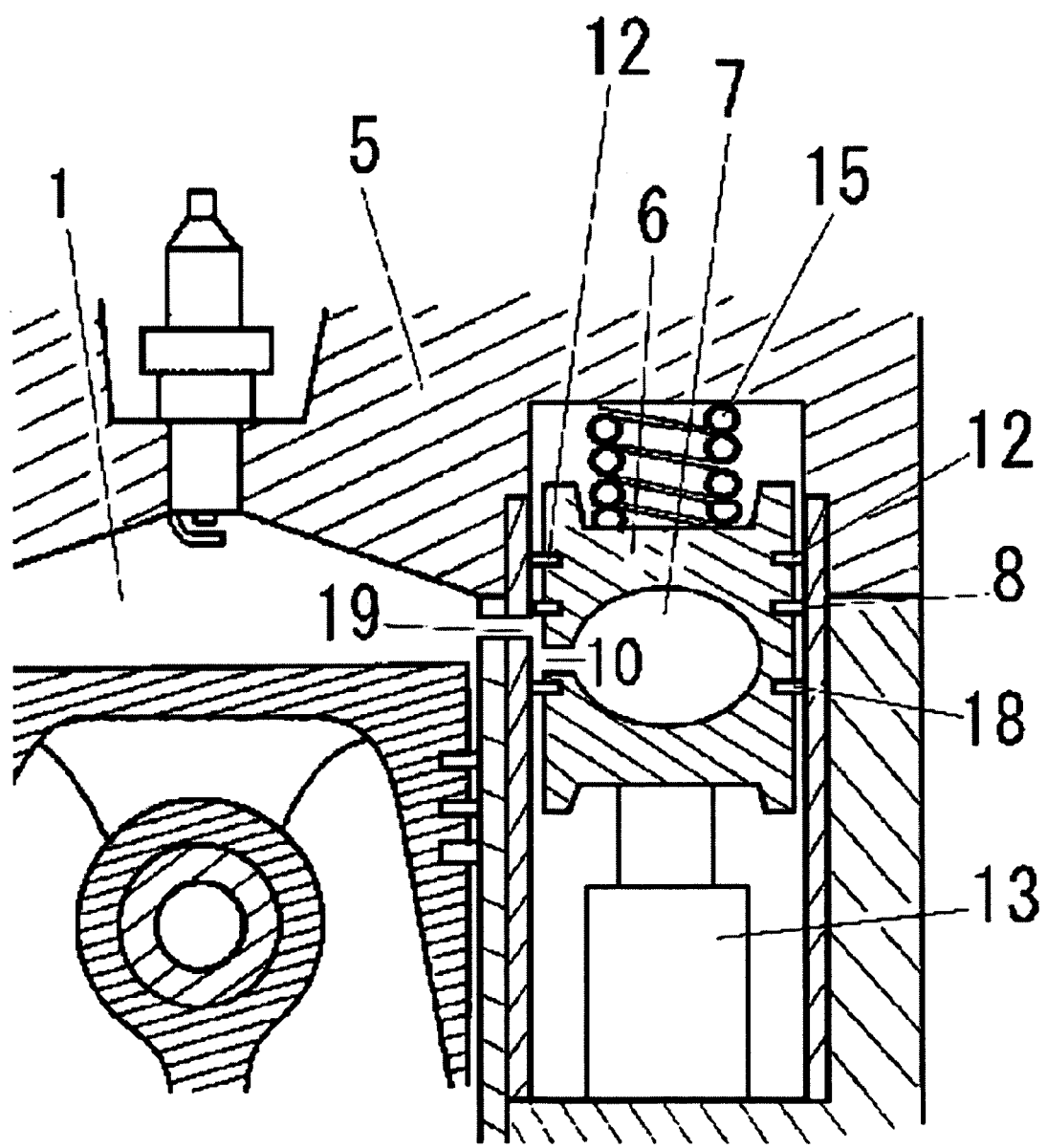

FIGS. 10 and 11 show the engine shown in FIG. 6. FIGS. 10 and 11 show a transition from a low load condition to a high load condition.

The durability of the actuator 13 will be explained below.

When the cylindrical side surface between the two compression rings 8 and 12 is positioned at the cylinder opening 11, the piston is under a light load. With the piston under a light load, the combustion gas in the main combustion chamber 1 does not flow into the auxiliary cylinder 2, so that the pressure of the gas is not applied on the top of the valve body 6 and the actuator 13.

When the piston is under a heavy load, combustion gas flows out of the main combustion chamber 1 into the cavity 7, applying two equal pressures on the upper and under sides of the cavity 7. The two pressures are applied in opposite directions axially of the auxiliary cylinder 2 and balanced. With the piston under a heavy load, the compression rings 8 and 18 seal the combustion gas in the main combustion chamber 1, keeping the pressure of the gas away from the actuator 13. With the piston under a heavy load, two equal forces are exerted in opposite directions on the rings 8 and 18. Therefore, with the piston under a heavy load, the durability of the actuator 13 does not decrease. This advantage is provided by the engines shown in FIGS. 6-12.

In each of the engines shown in FIGS. 6 and 7, the actuator 13 does not shift the valve body 6 when the piston is under light and heavy loads. Therefore, these engines can perfectly achieve the first object of the present invention when the piston is under light and heavy loads.

However, when the piston load is switched between light and heavy loads, the actuator 13 shifts the valve body 6. This may make the valve body 6 seize up, as explained with reference to the engine shown in FIG. 1. A method for solving this problem will be explained with reference to Embodiment 3.

Figure 8:
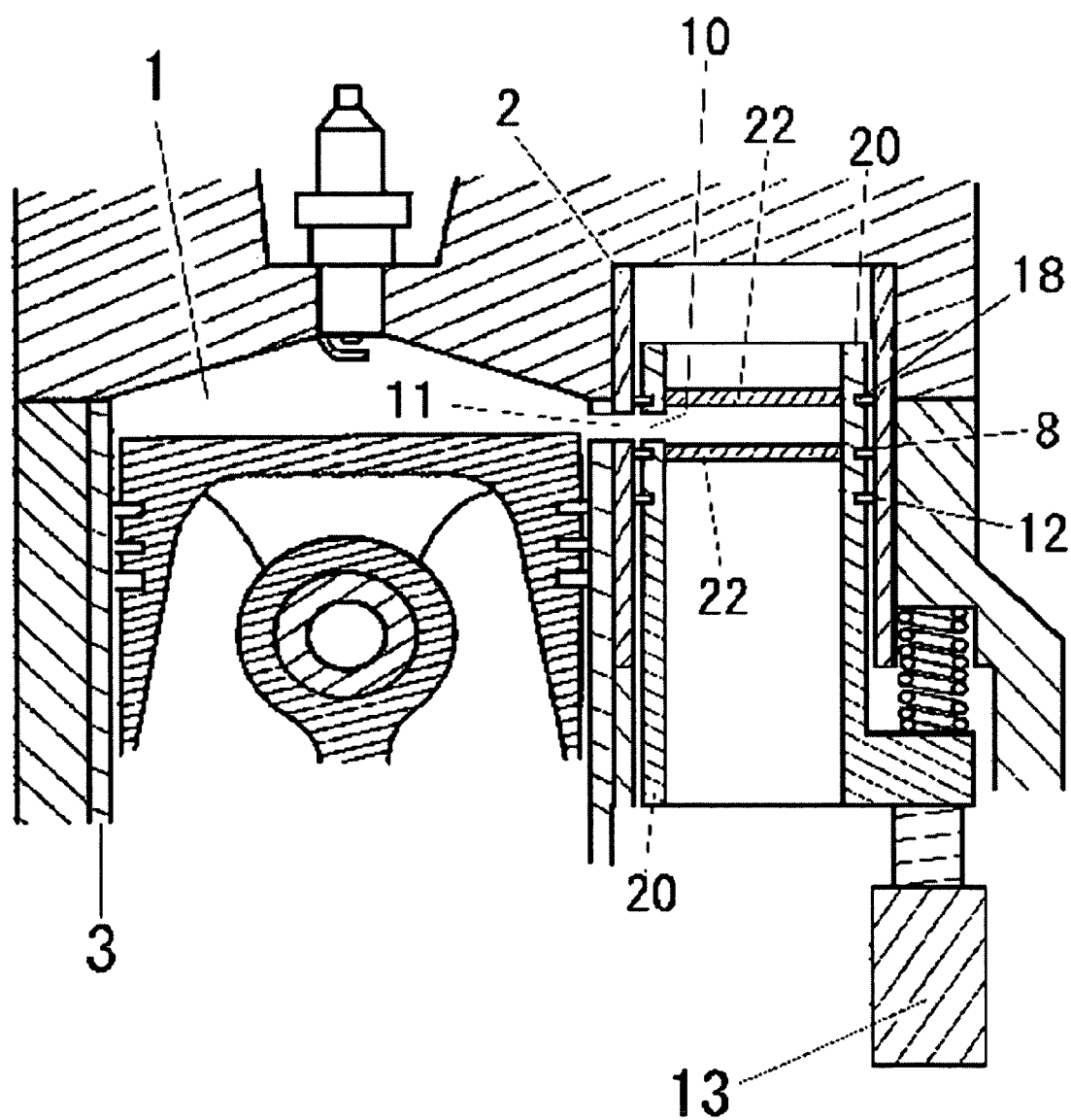

The engine shown in FIG. 8 differs in including a cylindrical sleeve 20 as a slidable valve body and a cross pipe 22. When the sleeve 20 is positioned as shown in FIG. 8, the compression ratio in the main combustion chamber 1 is low.

Figure 9:
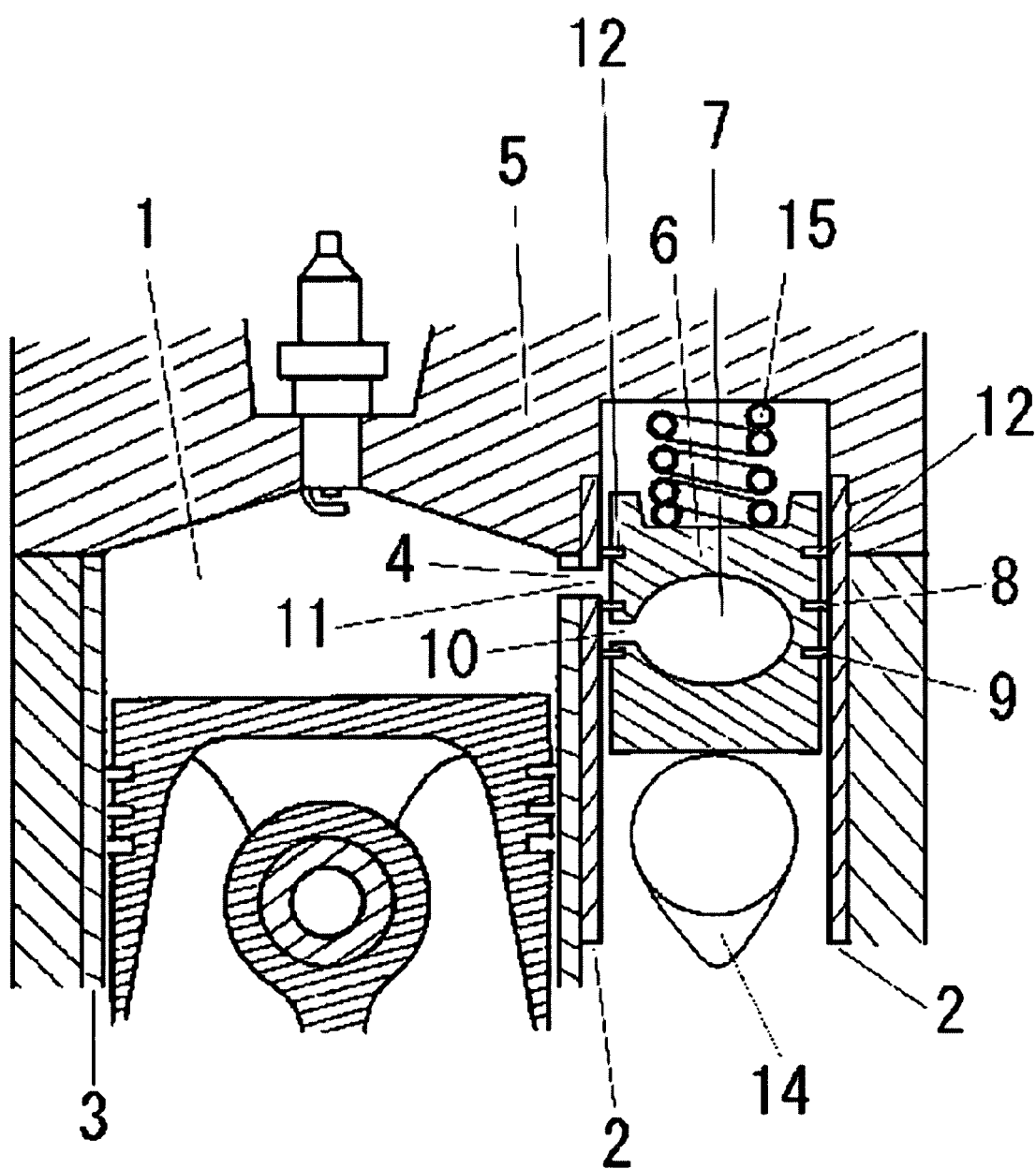

The engine shown in FIG. 9 includes an actuator consisting of a cam 14 and a mechanism for changing the phase of the cam. The actuator shifts the valve body 6 according to the change in the load on the piston. The phase of the cam 14 is so controlled that, while the piston is under light loads, the cam 14 lifts the valve body 6 during the exhaust strokes of the piston. The phase of the cam 14 is so controlled that, while the piston is under heavy loads, the cam 14 lifts the valve body 6 from the last stage of each compression stroke of the piston till the first stage of the following expansion stroke of the piston.

Figure 12:
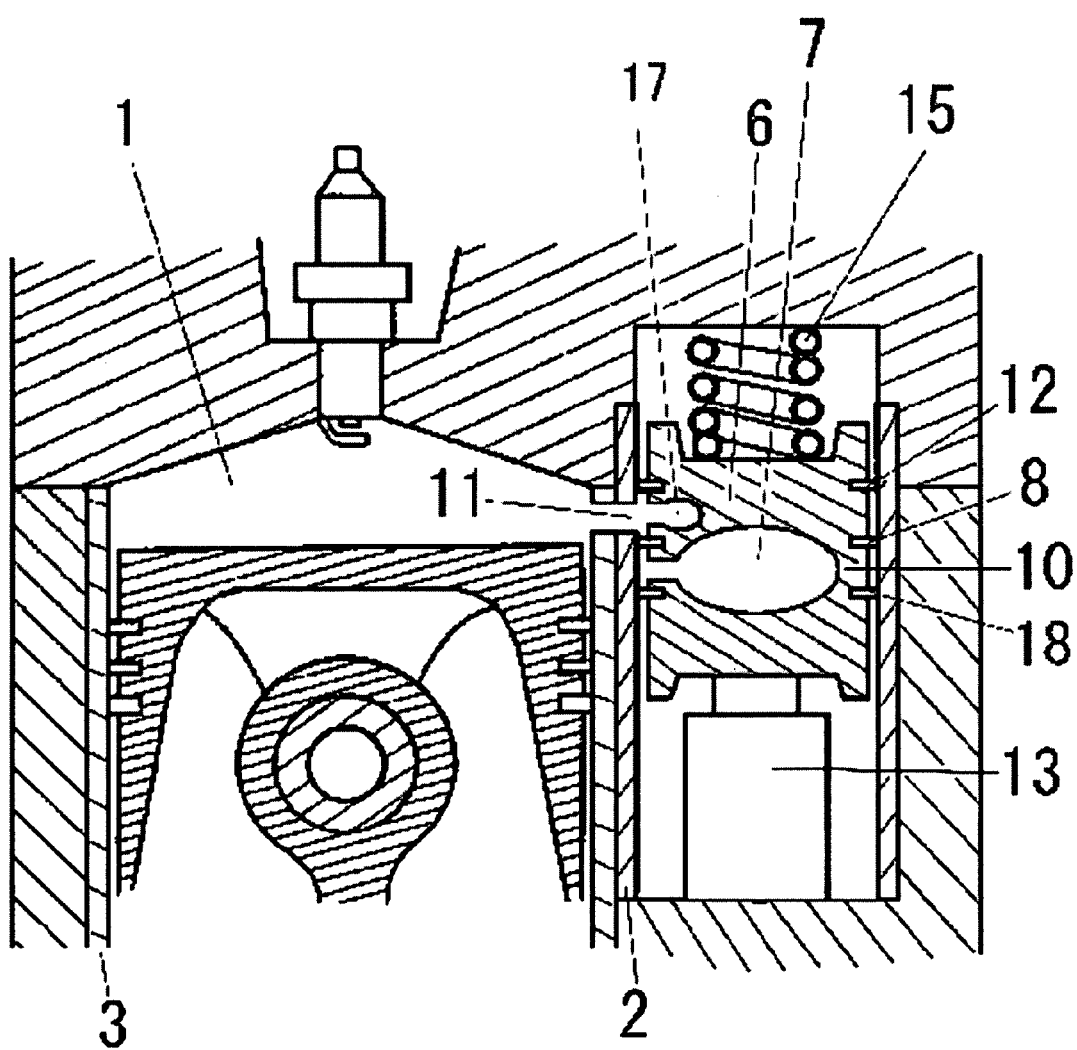

The engine shown in FIG. 12 differs in that the valve body 6 has a small concave 17 with a port formed on the cylindrical side of this body between the compression rings 8 and 12. When the valve body 6 is positioned as shown in FIG. 12, the compression ratio in the main combustion chamber 1 is high.

The other advantages of the engines shown in FIGS. 6-12 are advantages of the second aspect of the present invention, which are explained in the DISCLOSURE OF THE INVENTION.

The engines shown in FIGS. 13-18 correspond to the third aspect of the present invention. With regard to these engines, only the differences between them and the engines shown in FIGS. 1-5 will be explained. Each of the engines shown in FIGS. 13-18 includes a slidable valve body 6 and an actuator for shifting this body according to the change in the load on the piston.

Figure 13:
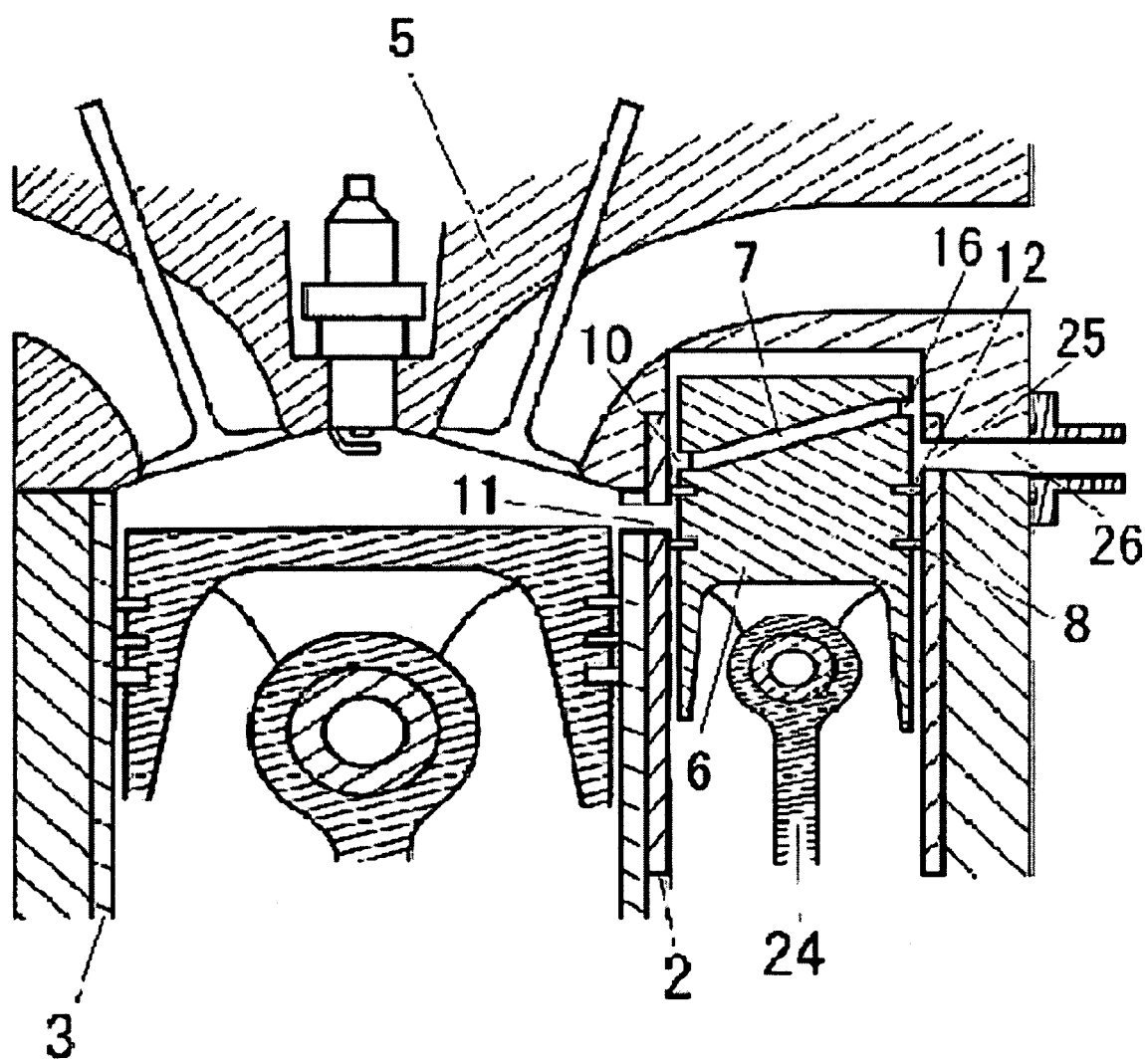
FIGS. 13-18 are sectional views of engines according to other embodiments of the present invention, which correspond to the third aspect of the invention.
Figure 15:
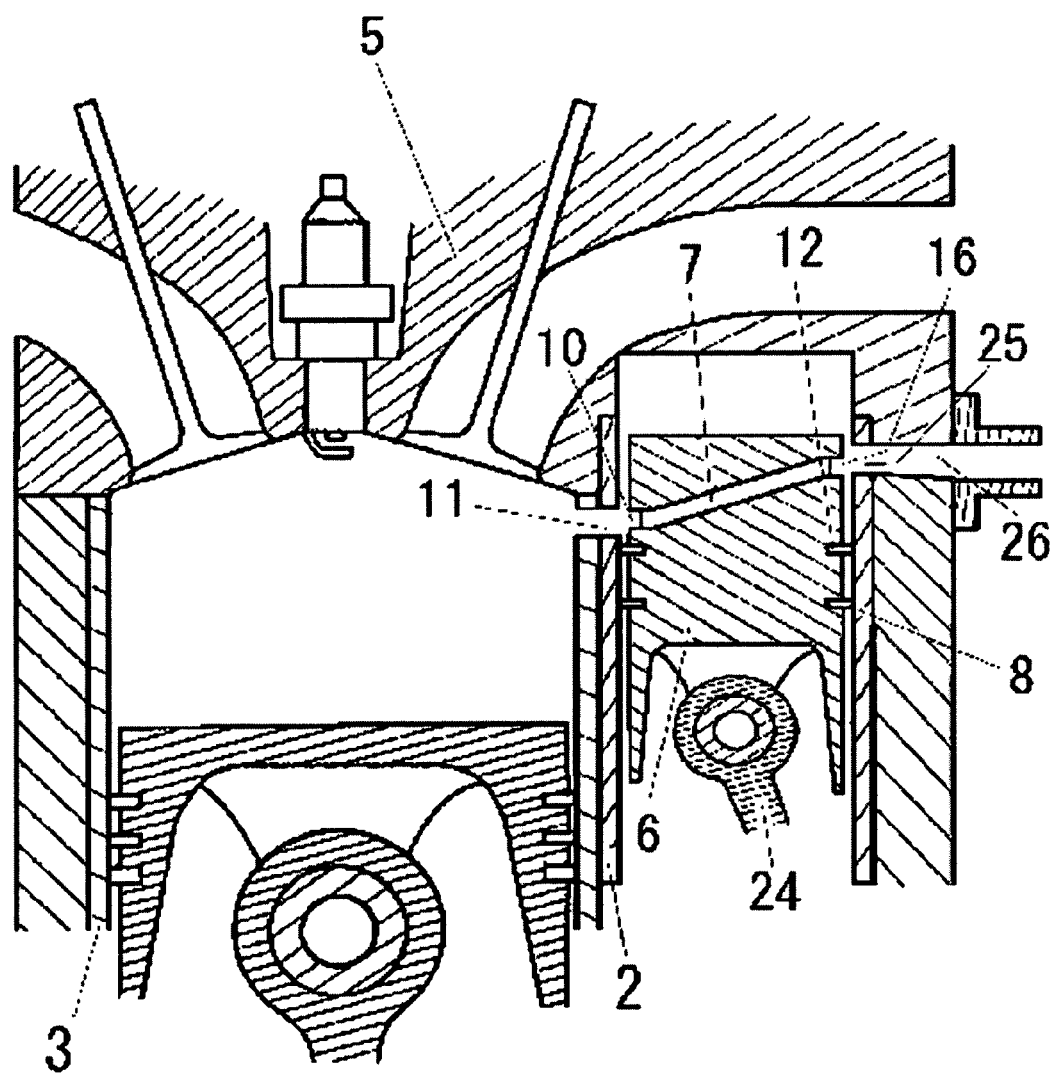

The actuator of the engine shown in FIGS. 13 and 15 includes the crank and connecting rod 24 of the engine. FIG. 15 shows the piston acting during a suction or exhaust stroke. FIG. 13 shows the piston acting during a stroke other than the suction and exhaust strokes.

With reference to FIGS. 13 and 15, the valve body 6 is fitted with a first compression ring 8 and a second compression ring 12 around it and has a valve passage 7 formed through it. The ends 10 and 16 of the valve passage 7 are positioned outside a cylindrical side surface of the valve body between the rings 8 and 12. The auxiliary cylinder 2 has two openings 11 and 25 formed through its wall. An auxiliary passage 26 for suction or exhaust gas is formed between the cylinder head and block. This passage 26 is aligned with the cylinder opening 25.

As shown in FIG. 15, the end 10 of the valve passage 7 is aligned with the opening 11 of the auxiliary cylinder 2 when the other end 16 is aligned with the other opening 25.

When the actuator shifts the valve body 6 to the position shown in FIG. 15, the main combustion chamber 1 communicates with the auxiliary passage 26 through the valve passage 7. When the actuator shifts the valve body 6 to the position shown in FIG. 13, the cylindrical side surface between the compression rings 8 and 12 is positioned at the cylinder opening 11, so that the valve passage 7 is isolated from the main combustion chamber 1.

The durability of this actuator will be explained below.

The slidable valve functions as a suction or exhaust valve. During the combustion and expansion strokes of the piston, the compression rings 8 and 12 seal the combustion gas in the main combustion chamber 1, so that the gas does not flow into the auxiliary cylinder 2 and auxiliary passage 26.

During the suction strokes of the piston, the slidable valve 6 functions as a suction valve, with its passage 7 connecting the main combustion chamber 1 and auxiliary passage 26. During the suction strokes, no combustion gas exists in the main combustion chamber 1. During the other strokes of the piston, the cylindrical side surface between the compression rings 8 and 12 is positioned at the cylinder opening 11, so that the pressure of the combustion gas is not applied on the top of the valve body 6 and the actuator.

Accordingly, during all the piston strokes, the durability of the actuator does not decrease. This makes it possible to achieve part of the first object of the present invention.

If the actuator includes a cam, and if the slidable valve functions as a suction valve, the cam does not shift the valve body 6 during the combustion and expansion strokes, so that the valve body 6 does not seize. This makes it possible to perfectly achieve the first object of the present invention.

If the slidable valve functions as a suction valve, it connects the main combustion chamber 1 to the auxiliary passage 26 when each suction stroke starts. If the slidable valve functions as a suction valve, it isolates the main combustion chamber 1 from the auxiliary passage 26 when each suction stroke ends.

If the slidable valve functions as an exhaust valve, it connects the main combustion chamber 1 to the auxiliary passage 26 when each exhaust stroke starts. If the slidable valve functions as an exhaust valve, it isolates the main combustion chamber 1 from the auxiliary passage 26 when each exhaust stroke ends.

If the slidable valve functions as an exhaust valve, the pressure of the combustion gas is applied on the under side of the valve passage 7 and the actuator when each exhaust stroke starts. However, the applied pressure is low. In this case, exhaust gas flows from the main combustion chamber 1 to the vicinity of the actuator.

Figure 14:
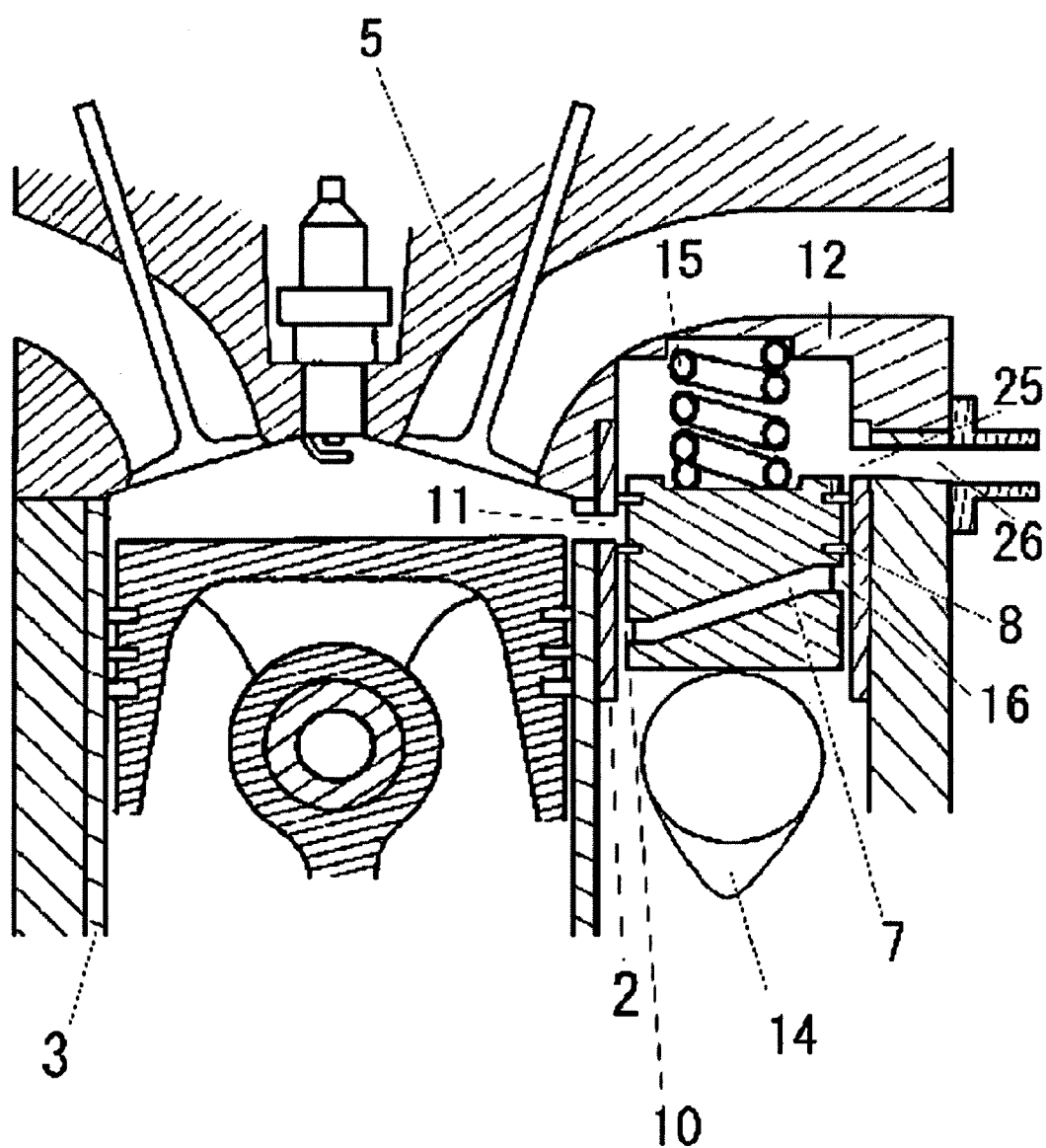
Figure 16:
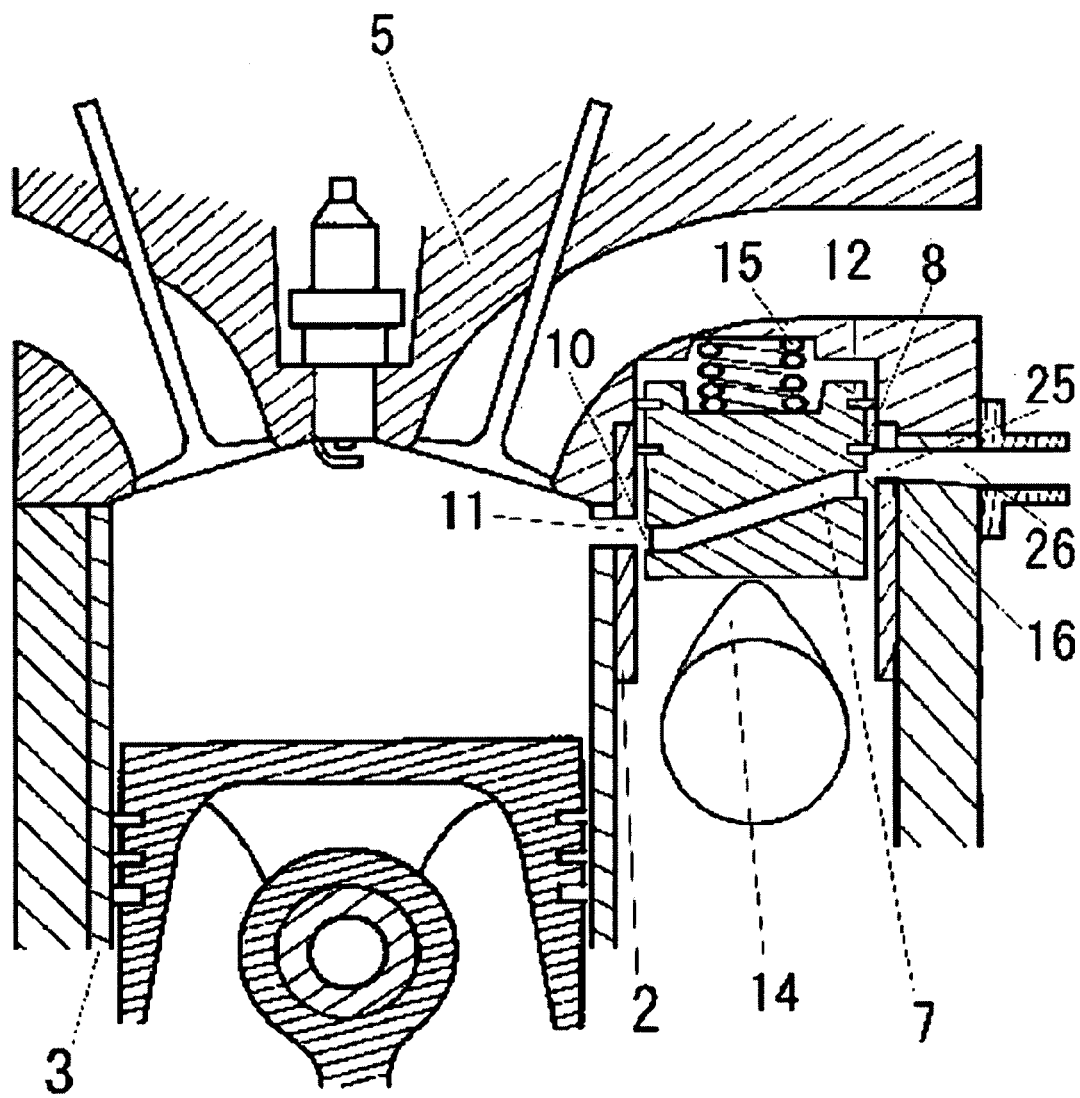
Figure 17:
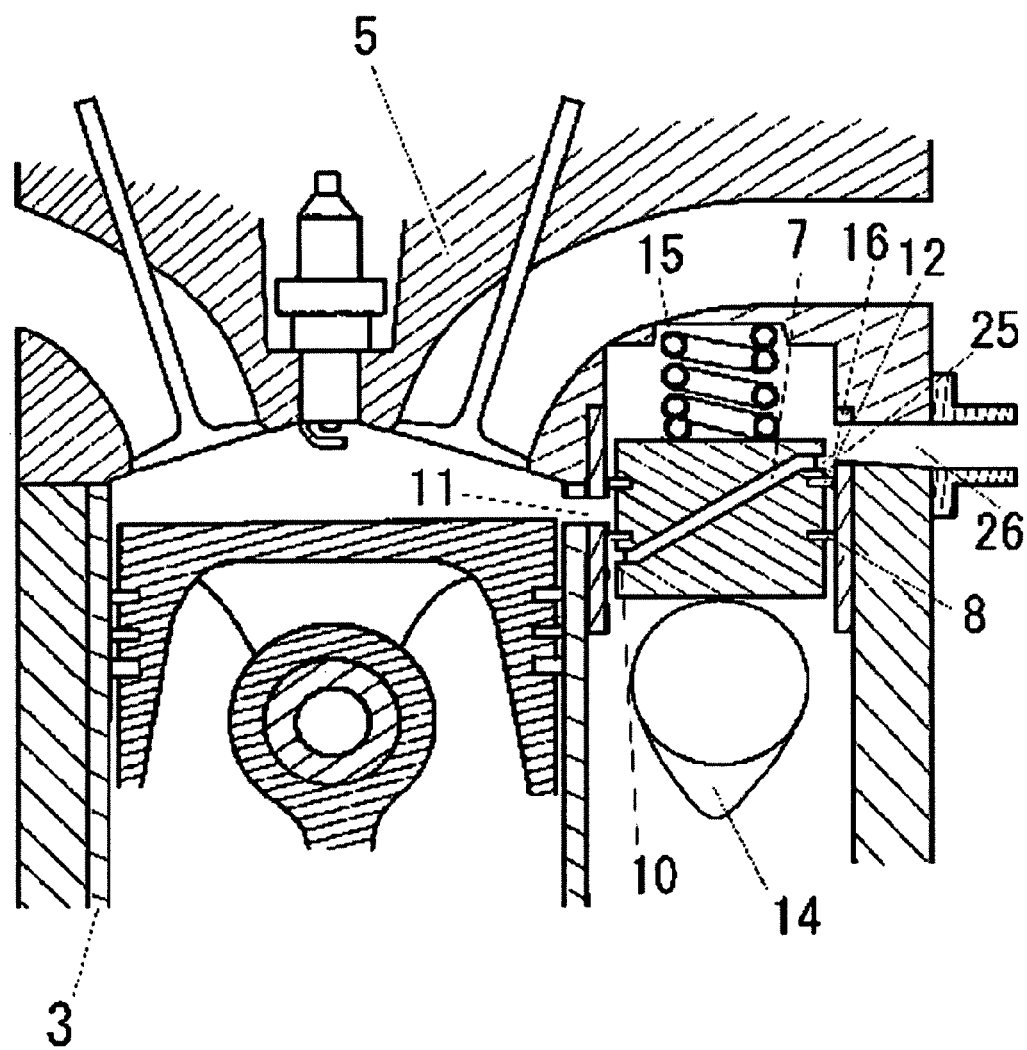

The actuator of the engine shown in FIGS. 14, 16, and 17 includes a cam 14. FIG. 16 shows the piston acting during a suction or exhaust stroke. FIGS. 14 and 17 show the piston acting during strokes other than the suction and exhaust strokes. Otherwise, this engine is similar to the engine shown in FIGS. 13 and 15.

Figure 18:
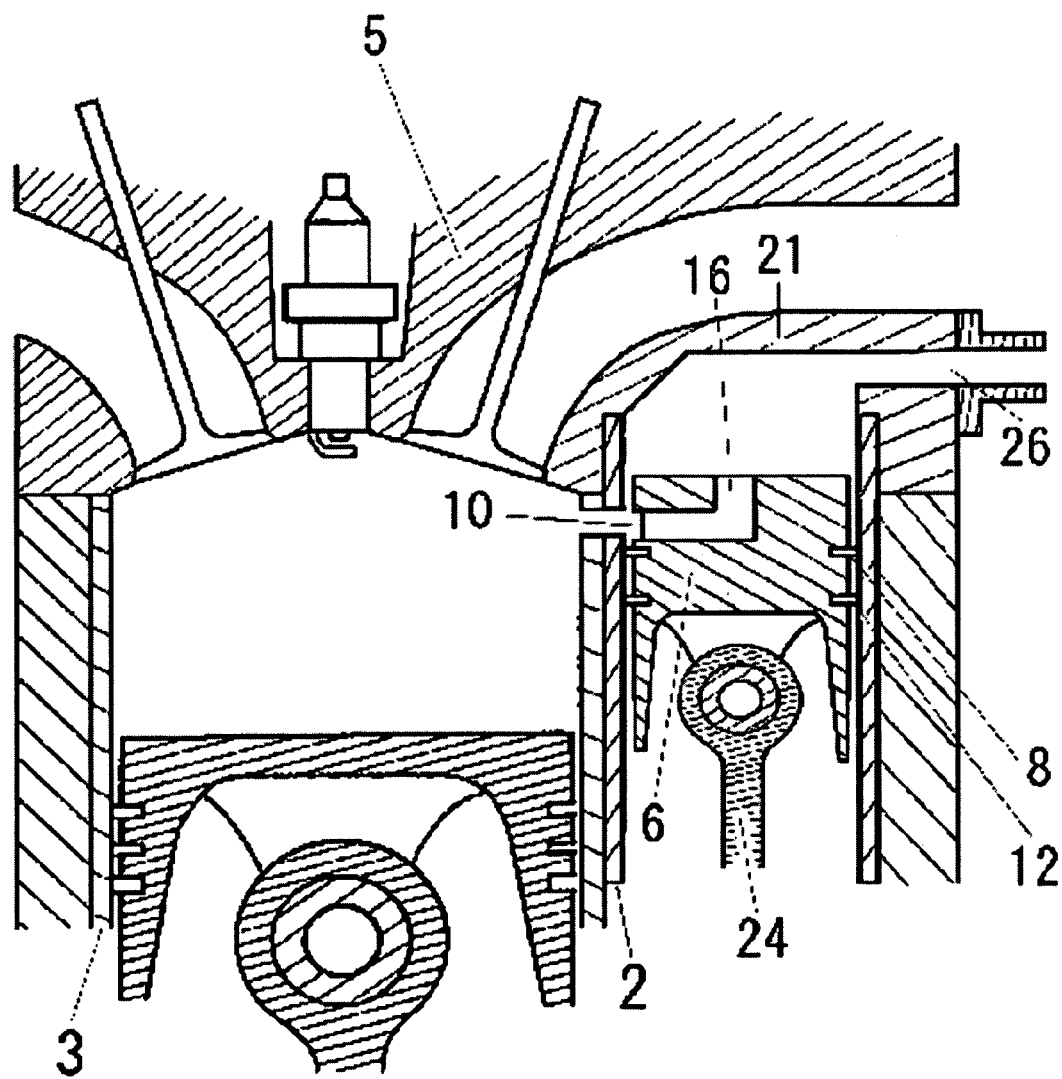

With reference to FIG. 18, the cylinder head 5 has a space 21 and an auxiliary passage 26 for suction or exhaust gas. The space 21 communicates with the auxiliary passage 26 and adjoins the space over the valve body 6 in the auxiliary cylinder 2. The valve body 6 has a passage 7 formed through it. One end 16 of the valve passage 7 communicates with the head space 21, so that this passage 7 keeps communicating with the auxiliary passage 26 through the space 21. Otherwise, this engine is similar to the engine shown in FIGS. 13 and 15.

The actuators of the engines shown in FIGS. 13-18 synchronize during all the piston strokes and may include a crank or a cam, or may be electromagnetic or electric.

In each of the engines shown in FIGS. 13-18, the slidable valve switches the communication between the main combustion chamber 1 and auxiliary passage 26 and the isolation of the chamber and this passage from each other.

The other advantages of the engines shown in FIGS. 13-18 are advantages of the third aspect of the present invention, which are explained in the DISCLOSURE OF THE INVENTION.

In each of the engines shown in FIGS. 6-12, when the piston load is switched, the first compression ring 8 shifts to the opening 11 of the auxiliary cylinder 2, and combustion and expansion take place a number of times, increasing the heat load on this ring 8. A method for solving the problem of heat load will be explained below.

Figure 19:
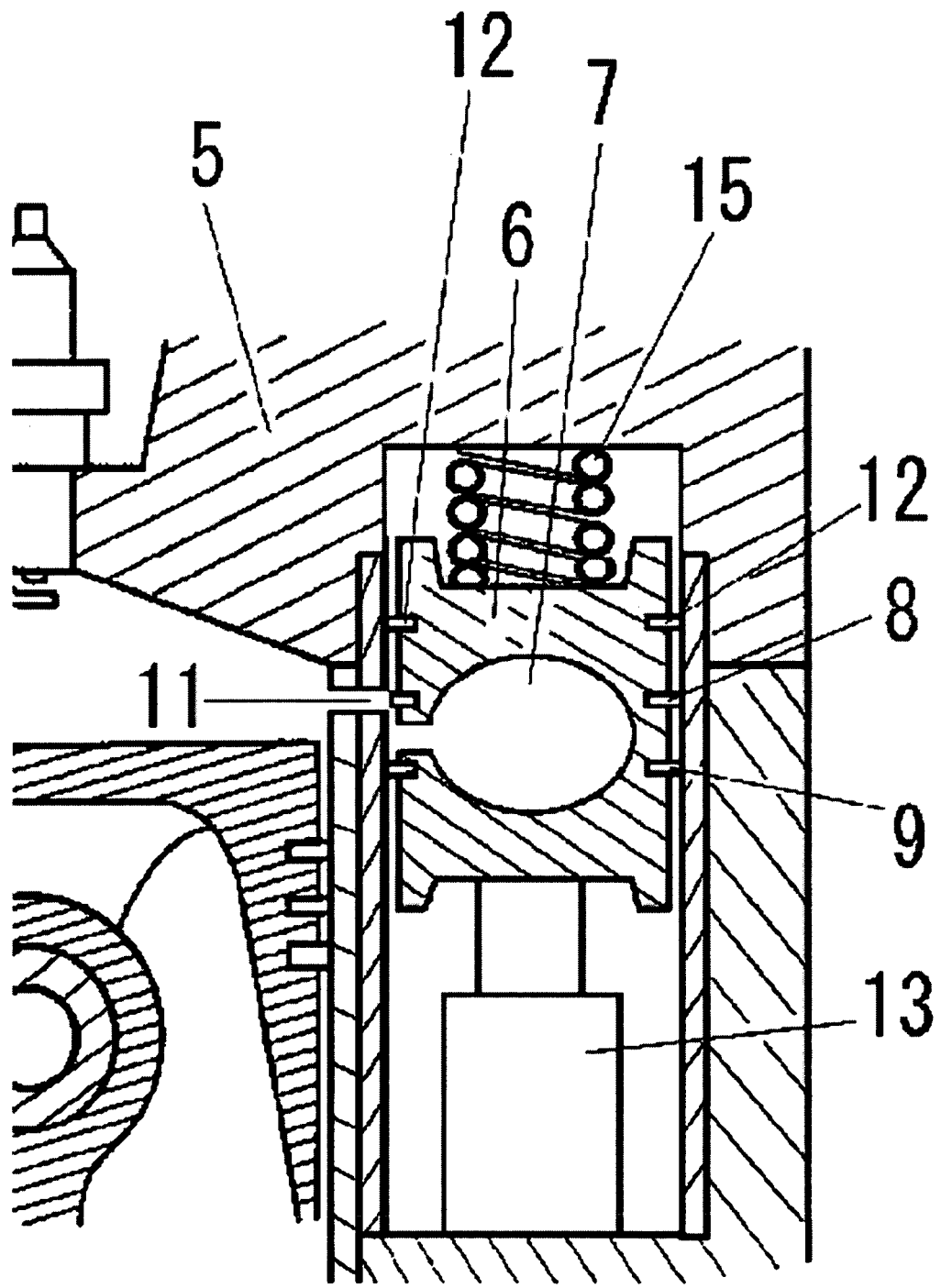
FIG. 19 is a sectional view of an engine as an improvement on the engines shown in FIGS. 6-12.

With reference to FIG. 19, the opening 11 of the auxiliary cylinder 2 is nearly equal to or smaller than the thickness of the first compression ring 8 axially of this cylinder. This shortens the time during which both sides of this ring 8 are exposed to combustion gas. Accordingly, the heat load on the ring 8 decreases.

Another problem with the engines shown in FIGS. 6-12 will be explained below.

Figure 20:
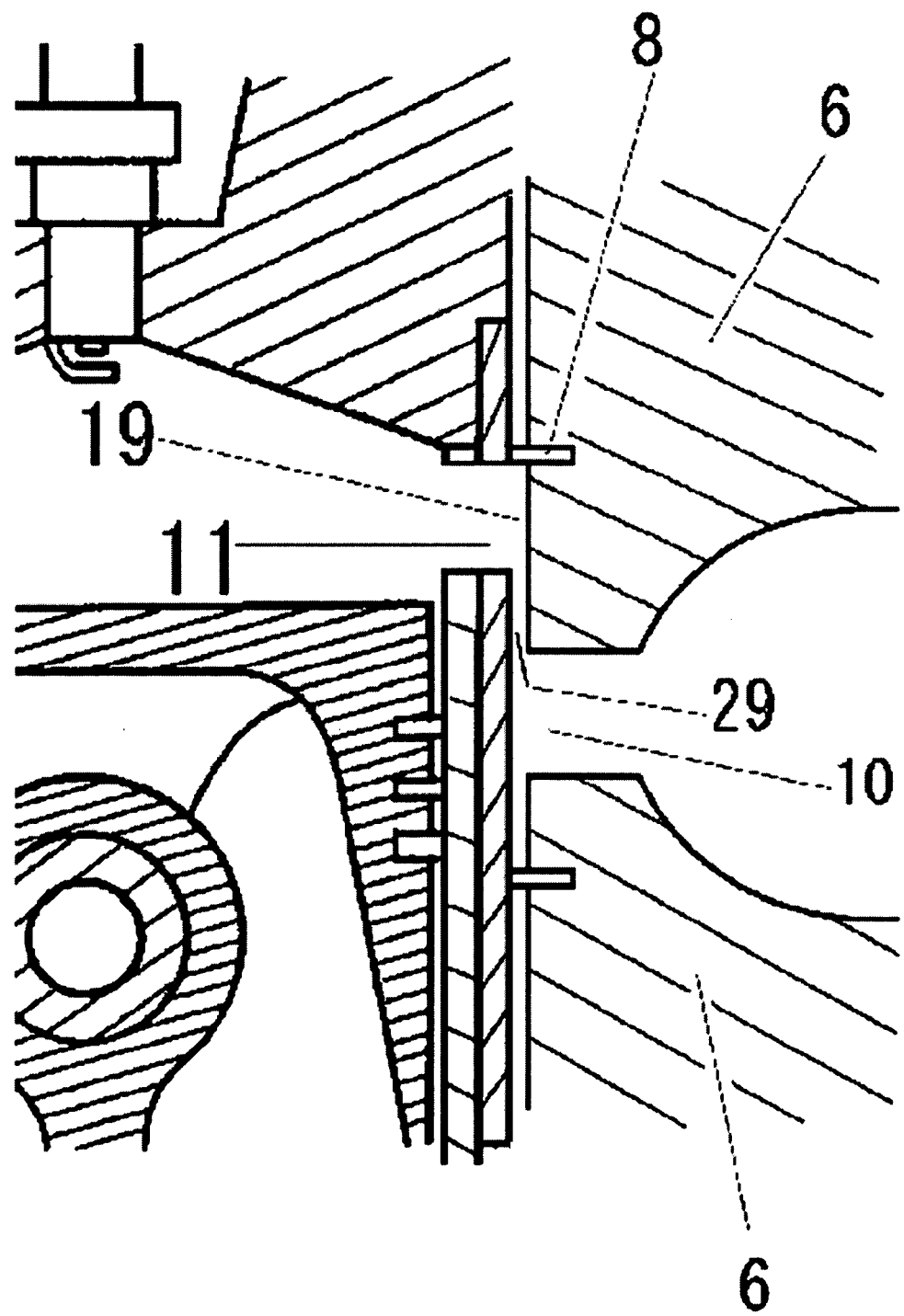
FIG. 20 is an enlarged sectional view of the engine shown in FIG. 11.

With reference to each of FIGS. 11 and 20, the opening 11 of the auxiliary cylinder 2 is smaller axially of this cylinder than the distance between the first compression ring 8 and the port 10 of the cavity 7 in the valve body 6. As a result, when the piston load is switched between light and heavy loads, a narrow passage 29 is formed between the valve body 6 and auxiliary cylinder 2. Combustion gas flows through the narrow passage 29 axially of the auxiliary cylinder 2 and into the cavity 7, exerting an excessive force on the actuator 13. The excessive force reduces the durability of the actuator 13. A means for solving this problem will be explained below.

Figure 21:
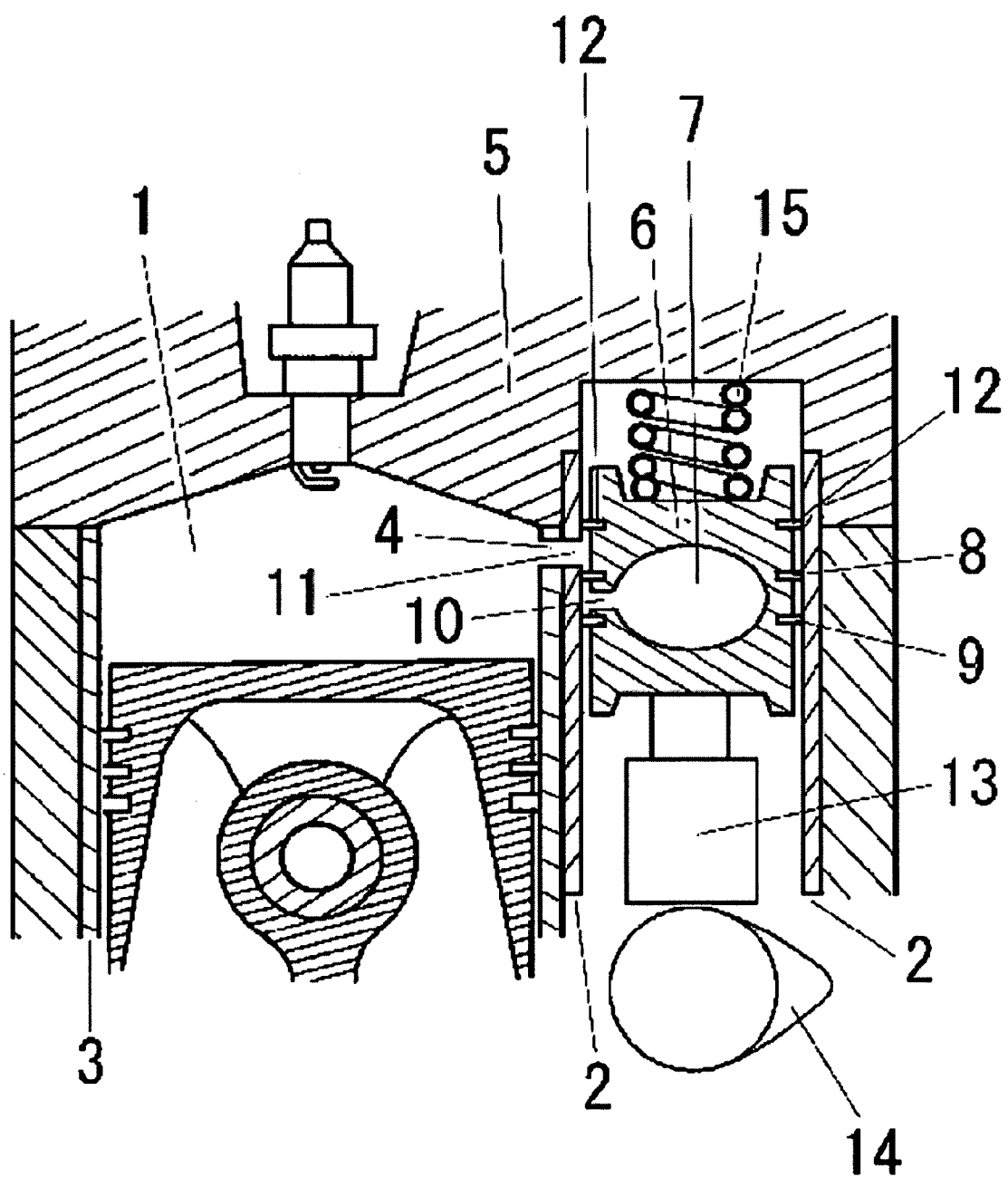
FIGS. 21-23 are sectional views of other engines as improvements on the engines shown in FIGS. 6-12.

With reference to FIG. 21, a pneumatic, hydraulic, electromagnetic, or electric actuator 13 is combined with a cam 14 and a mechanism for changing the phase of the cam. The actuator 13 is interposed between the cam 14 and valve body 6.

The phase of the cam 14 is so controlled that, when the load on the piston is switched during the combustion strokes of the piston, the cam 14 lifts the actuator 13 and valve body 6 until the port 10 of the cavity 7 in this body is aligned with the opening 11 of the auxiliary cylinder 2. This prevents a narrow passage 39 from being formed which would connect the main combustion chamber 1 and cavity 7 when the piston load is switched during the combustion strokes. Accordingly, the durability of the actuator 13 does not decrease. This also prevents the first compression ring 8 from being positioned at the cylinder opening 11 during the combustion strokes. Accordingly, the heat load on this ring 8 does not increase.

When the piston is under light and heavy loads during the combustion strokes, the cam 14 does not lift the actuator 13 and valve body 6.

In the engines shown in FIGS. 6-12, seizures may occur when the piston load is switched. A method for solving this problem will be explained below.

Figure 22:
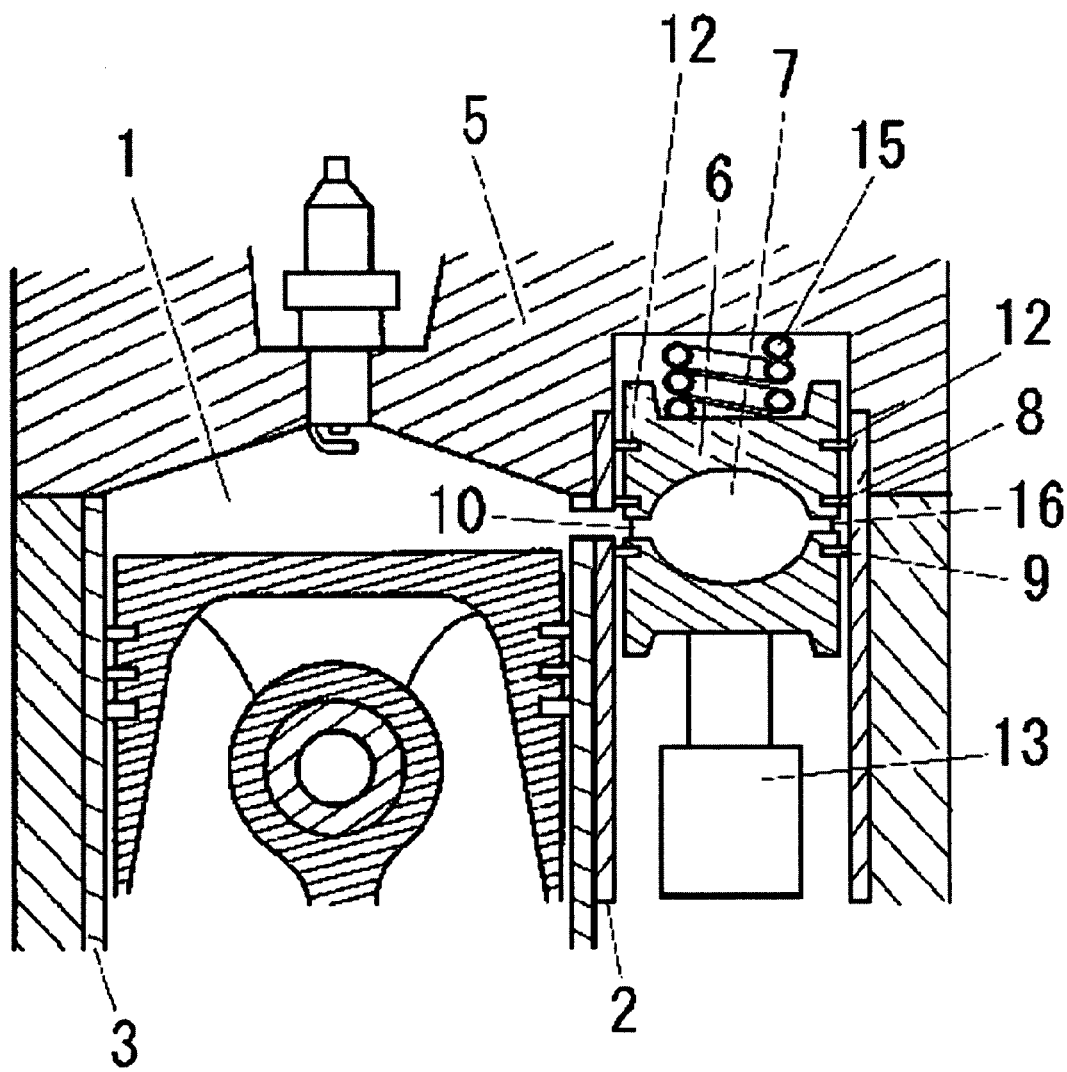

With reference to FIG. 22, the cavity 7 has another port 16 formed on the cylindrical side surface of the valve body 6. This port 16 is positioned between the compression rings 8 and 18 and opposite to the cavity port 10. When the piston load is switched, the combustion gas flowing through the port 10 into the cavity 7 passes through the other port 16, without pressing the valve body 6 against the auxiliary cylinder 2 away from the main combustion chamber 1. This makes it possible to solve the problem of seizure.

In each of the engines shown in FIGS. 6-12, if flames propagate to the auxiliary combustion chamber, the propagation path is long. This makes the engines liable to knock. This problem could be solved by first firing the second ignition plug fitted on the wall of the auxiliary combustion chamber.

However, if a second ignition plug were fitted on the wall of the auxiliary combustion chamber of the engine shown in FIG. 4, the weight of the valve body 6 would increase. This problem could be solved by adding the following structures to the engine shown in FIG. 5.

Figure 23:
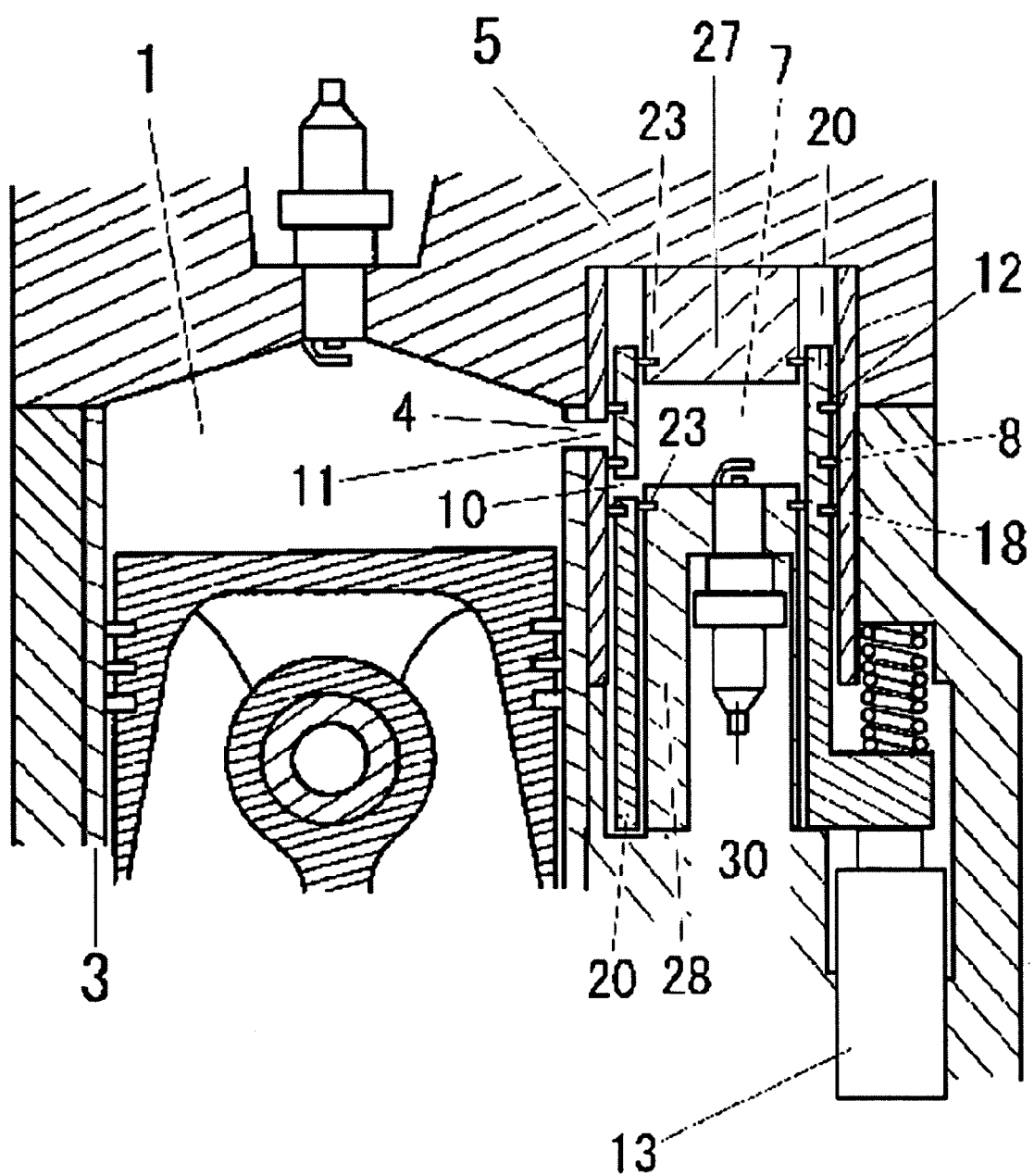
Figure 24:
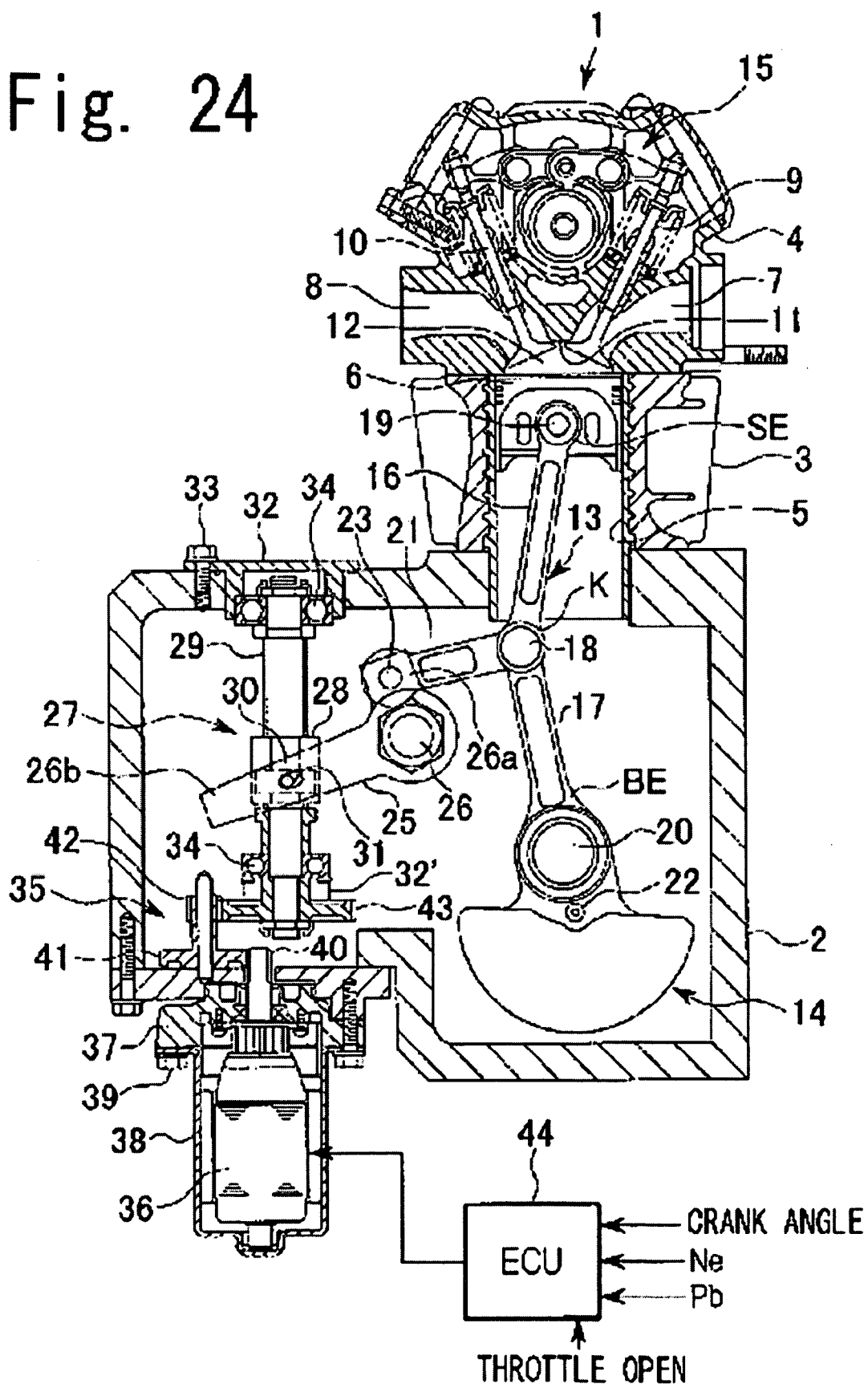
FIG. 24 is a sectional view of the engine disclosed in JP 2005-30235 A.
Figure 25:
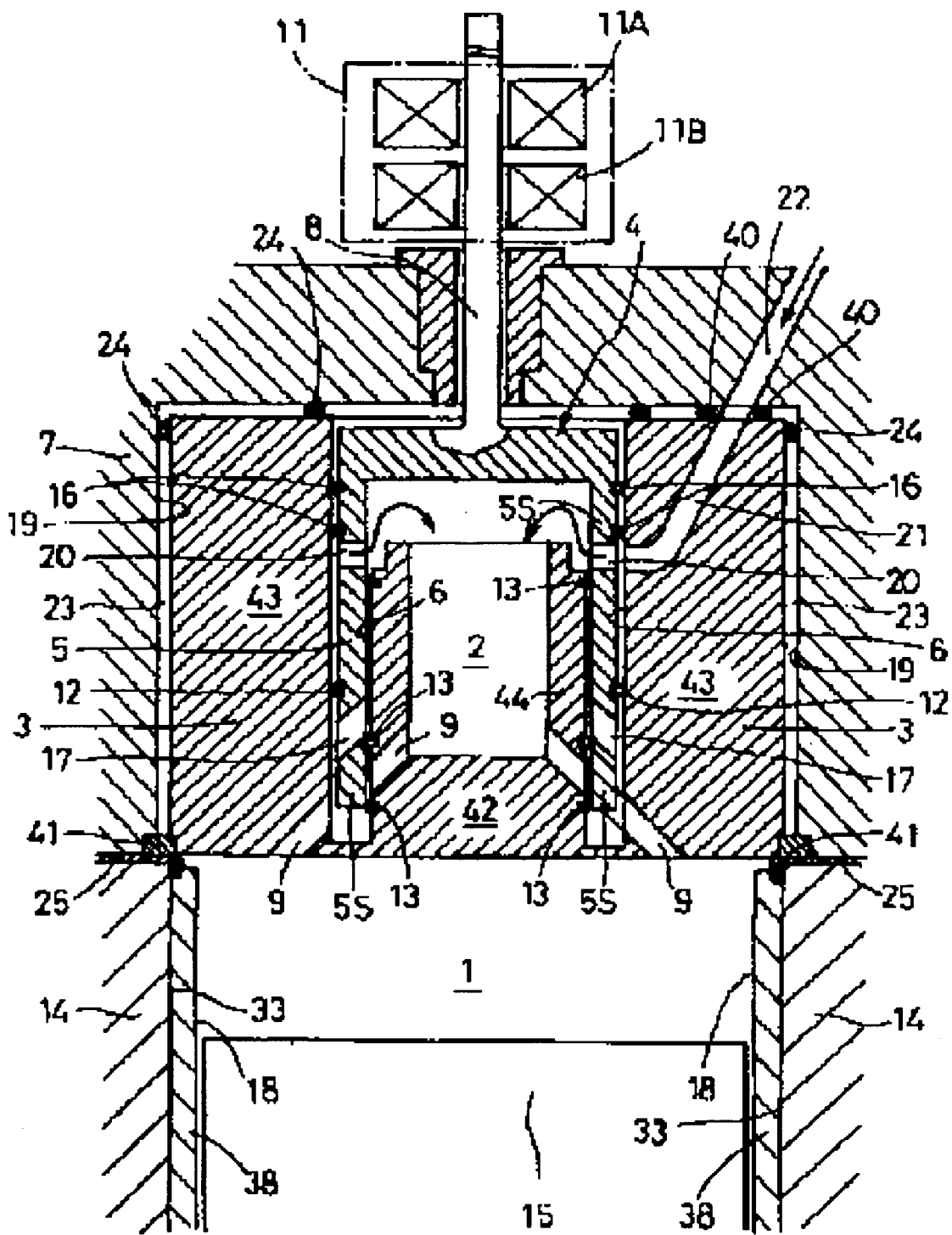
FIG. 25 is a sectional view of the engine disclosed in JP H7-310551 A.
Figure 26:
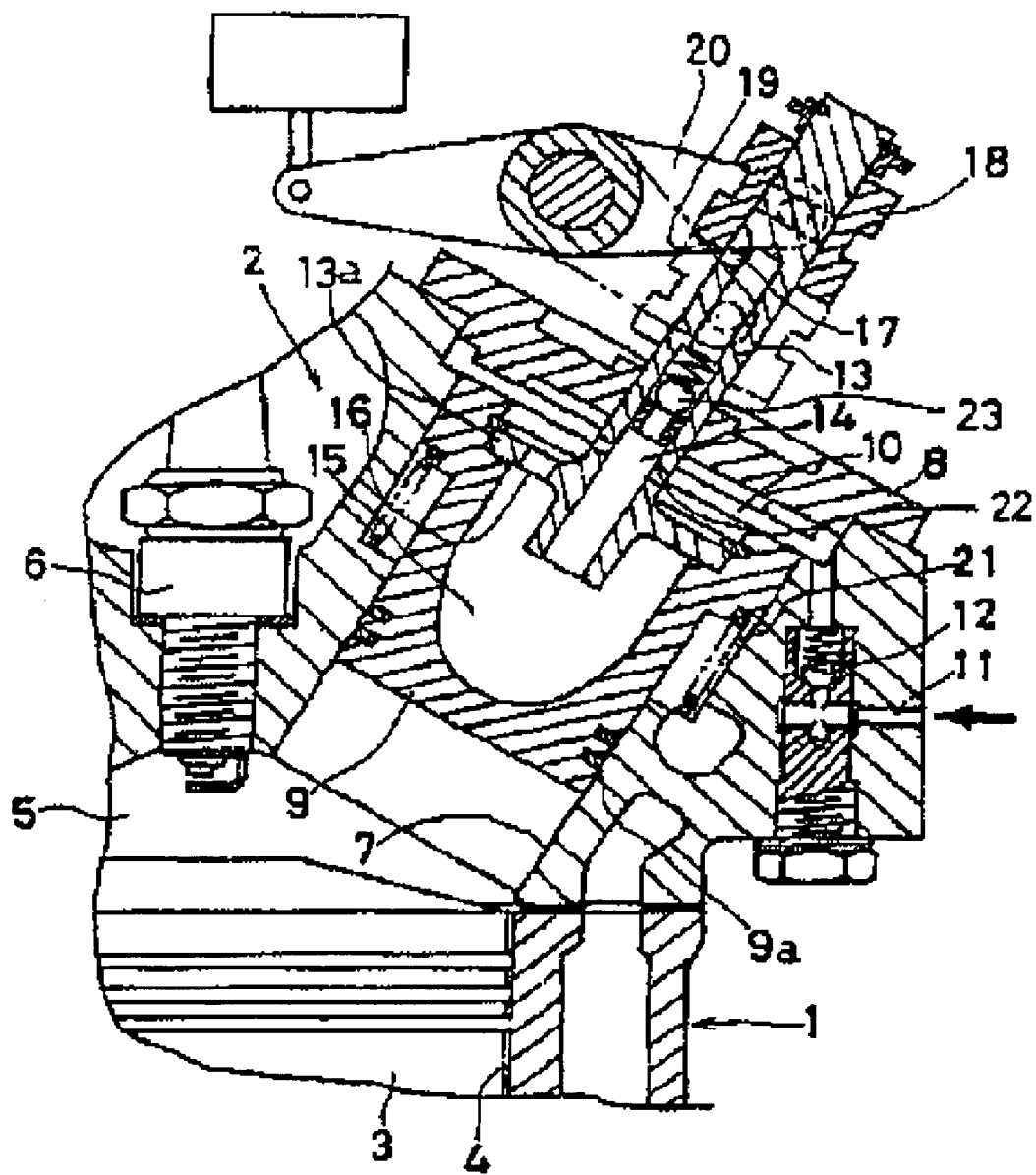
FIG. 26 is a sectional view of the engine disclosed in JP S62-38835 A.
Figure 27:
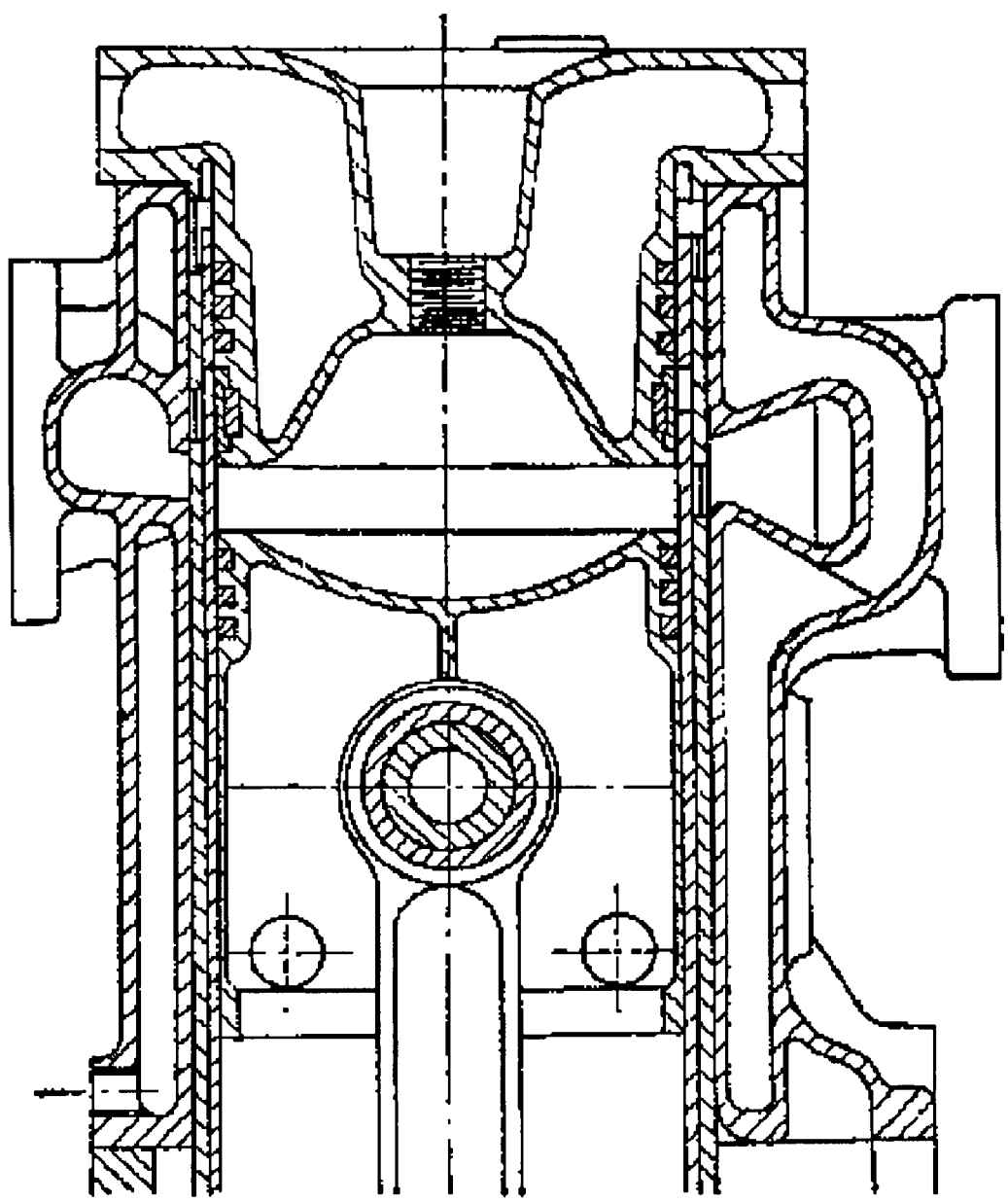
FIG. 27 is a sectional view of another conventional engine.
Figure 28:
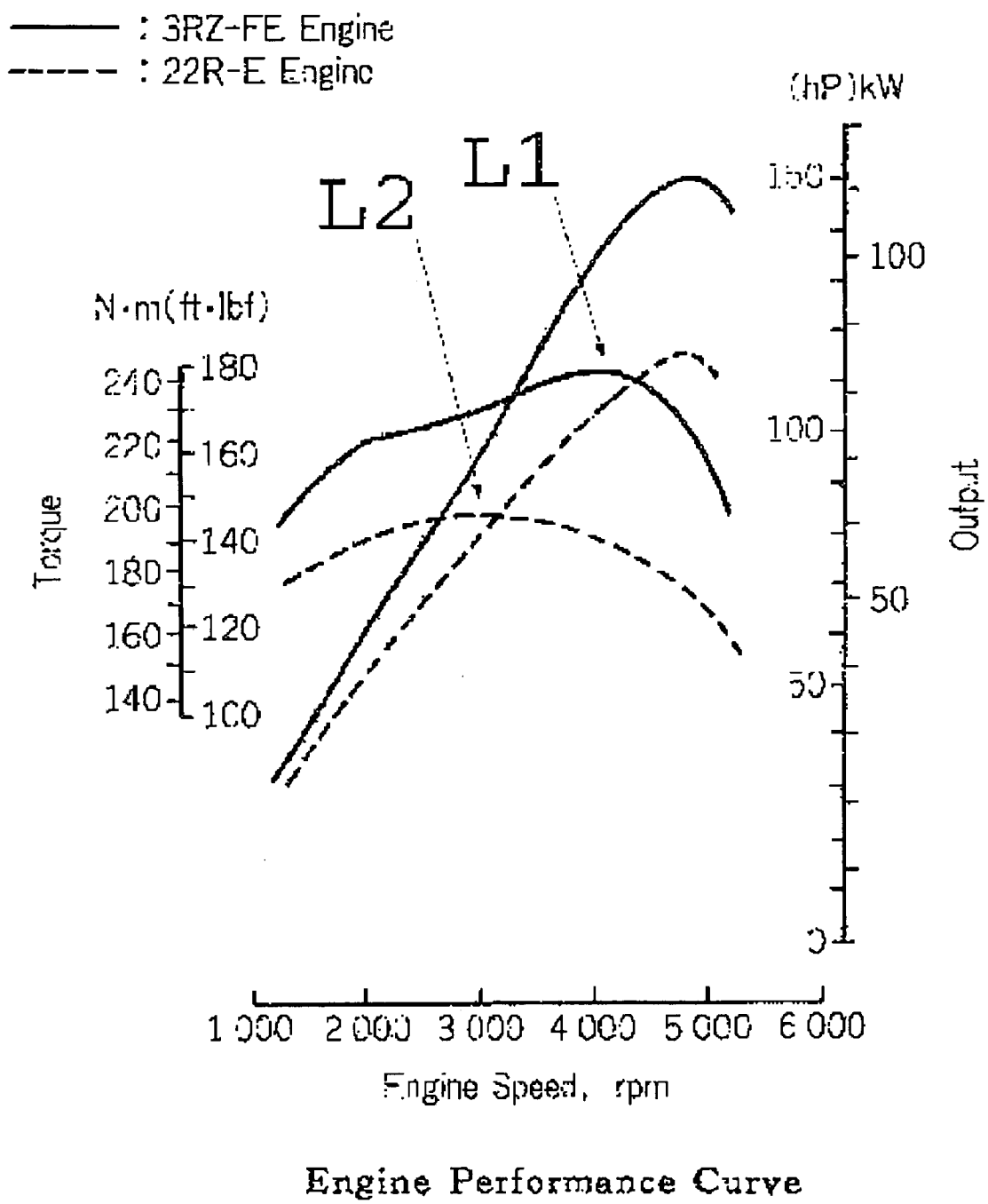
FIG. 28 shows the output from and the torque of a 3RZ-FE engine and a 22R-E engine.
Figure 29:
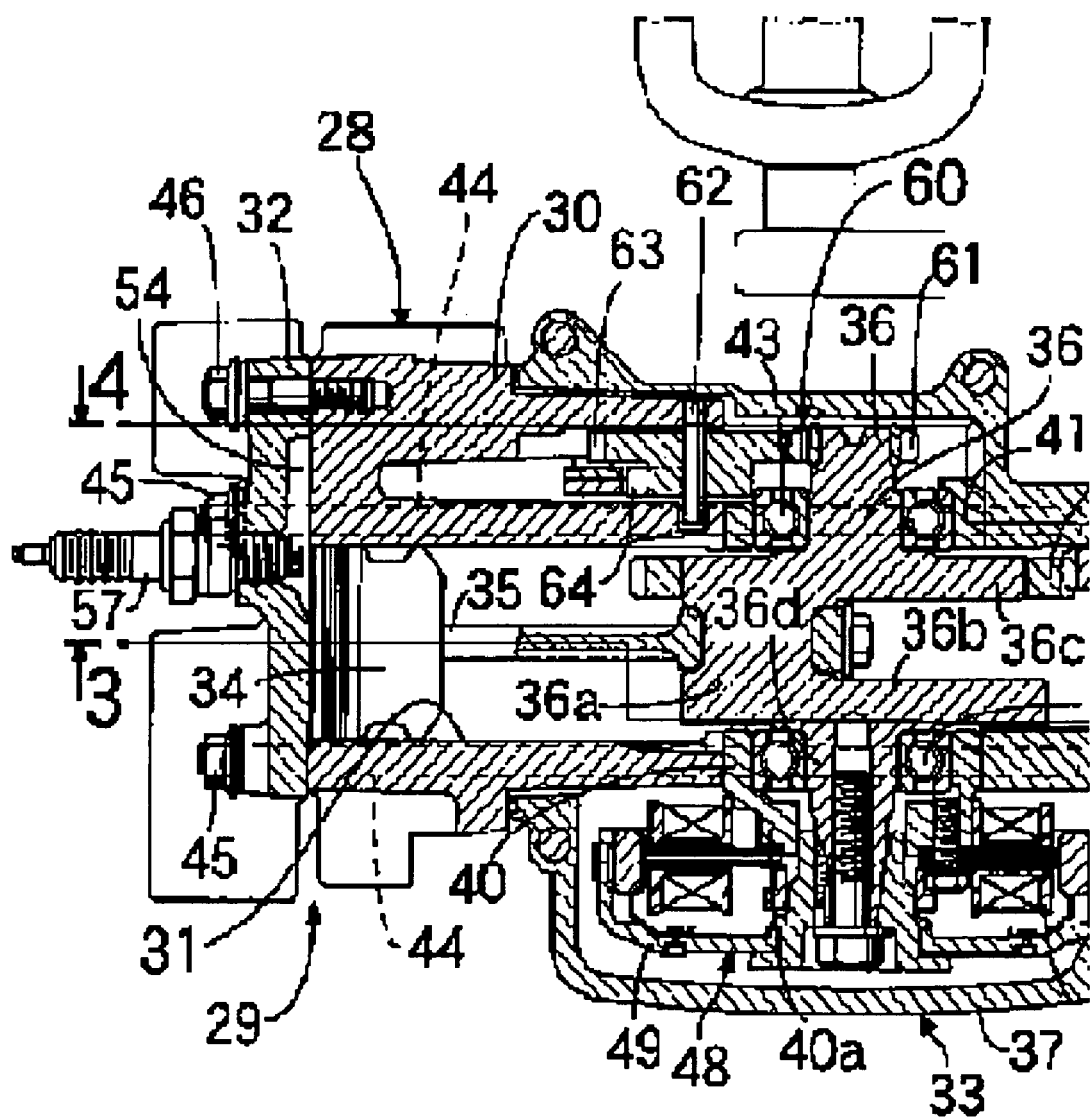
FIG. 29 is an enlarged sectional view of the engine shown in FIG. 2 of JP 2000-282814 A.

With reference to FIG. 23, an upper part 27 and a lower part 28 are positioned inside the sleeve 20. These parts 27 and 28 are fixed to the cylinder head 5 and the cylinder block respectively. Each of the fixed parts 27 and 28 is fitted with a compression ring 23 around it. A cavity 7 is formed between the fixed parts 27 and 28 inside the sleeve 20. The lower part 28 is fitted with a second ignition plug 30 on its top. This keeps the weight of the valve body from increasing.

Alternatively, the upper part 27 might be fitted with a second ignition plug on its bottom.

In the Description of the Related Art, a problem is explained about the compatibility between the improvement in combustion gas conversion efficiency and the torque increase caused when the engines rotate at high speed. This problem can be solved as follows.

An engine has a slidable suction valve as shown in FIGS. 13-18. The strokes of the piston of this engine are not shorter than the diameter of the piston. In other words, the piston strokes are nearly equal to or longer than the piston diameter. This improves the combustion gas conversion efficiency of the engine as compared with the combustion gas conversion efficiency of short stroke engines. This also improves the suction efficiency of the engine rotating at high speed. As a result, the improvement in conversion efficiency can be compatible with the torque increase caused when the engine rotates at high speed.

What is claimed is:

1. A piston engine having a main cylinder, an auxiliary cylinder fitted outside the main cylinder, and a slidable valve, the engine being characterized by:
   the auxiliary cylinder having an opening;
   the opening communicating with a main combustion chamber;
   a connecting passage in vicinity of a top dead center, the connecting passage connecting the main combustion chamber and the opening;
   a valve body of the slidable valve fitted in the auxiliary cylinder and slidable axially of the auxiliary cylinder;
   the slidable valve body having a cylindrical side surface;
   the slidable valve body having a cavity formed therein;
   a first compression ring and a second compression ring both fitted on the cylindrical side surface;
   the cavity having a port formed in another part of the cylindrical side surface than the part of the cylindrical side surface that lies between the two compression rings, the port being adjacent to the main combustion chamber;
   an actuator for shifting the slidable valve body axially of the auxiliary cylinder;
   the main combustion chamber and the cavity adapted to be isolated from each other when the actuator shifts the slidable valve body to a position where the part of the cylindrical side surface that lies between the two compression rings faces the cylinder opening;
   the two compression rings adapted to seal combustion gas within the main combustion chamber to keep the combustion gas from flowing into the auxiliary cylinder when the cylindrical side surface between the two compression rings is aligned with the opening of the auxiliary cylinder;
   the main combustion chamber and the cavity adapted to communicate with each other when the actuator shifts the slidable valve body to a position where the cavity port faces the cylinder opening; and
   the valve body, the two compression rings, the cavity, and the actuator adapted to be an elements of the slidable valve.

2. A piston engine having a main cylinder, an auxiliary cylinder fitted outside the main cylinder, and a slidable valve, the engine being characterized by:
   the auxiliary cylinder having an opening;
   the opening communicating with a main combustion chamber;
   a connecting passage in vicinity of a top dead center, the connecting passage connecting the main combustion chamber and the opening;
   a valve body of the slidable valve fitted in the auxiliary cylinder and slidable axially of the auxiliary cylinder;
   the slidable valve body having a cylindrical side surface;
   the slidable valve body having a cavity formed therein;
   a first compression ring, a second compression ring, and a third compression ring all fitted on the cylindrical side surface;
   the first compression ring positioned between the second and third compression rings;
   the cavity having a port formed in the part of the cylindrical side surface that lies between the first and third compression rings, the port being adjacent to the main combustion chamber;
   an actuator for shifting the slidable valve body axially of the auxiliary cylinder according to a load change;
   the first compression ring adapted to isolate the main combustion chamber and the cavity from each other so as to raise a compression ratio when the actuator shifts the slidable valve body to a position where the part of the cylindrical side surface that lies between the first and second compression rings faces the cylinder opening;
   the two compression rings adapted to seal combustion gas within the main combustion chamber to keep the combustion gas from flowing into the auxiliary cylinder when the cylindrical side surface between the two compression rings is aligned with the opening of the auxiliary cylinder;
   the main combustion chamber and the cavity adapted to communicate with each other so as to lower the compression ratio when the actuator shifts the slidable valve body to a position where the cavity port faces the cylinder opening; and
   the valve body, the two compression rings, the cavity, and the actuator adapted to be an elements of the slidable valve.

3. A piston engine having a main cylinder, an auxiliary cylinder fitted outside the main cylinder, an overhead poppet valve, and a slidable valve, the engine being characterized by:
   the auxiliary cylinder having an opening;
   the opening communicating with a main combustion chamber;
   a connecting passage in vicinity of a top dead center, the connecting passage connecting the main combustion chamber and the opening;
   a valve body of the slidable valve fitted in the auxiliary cylinder and slidable axially of the auxiliary cylinder;
   the slidable valve body having a cylindrical side surface;
   the slidable valve body having a cavity formed therein;
   a first compression ring and a second compression ring both fitted on the cylindrical side surface;
   the cavity having a port formed in another part of the cylindrical side surface than the part of the cylindrical side surface that lies between the two compression rings, the port being adjacent to the main combustion chamber;
   the cavity having a second port formed outside the part of the cylindrical side surface that lies between the two compression rings;
   an actuator for shifting the slidable valve body axially of the auxiliary cylinder in synchronism with all strokes in one cycle of the engine;
   an auxiliary passage for suction or exhaust, the auxiliary passage communicating with the outside of the engine;
   the main combustion chamber and the auxiliary passage adapted to be isolated from each other when the actuator shifts the slidable valve body to a position where the part of the cylindrical side surface that lies between the two compression rings faces the cylinder opening;
   the two compression rings adapted to seal combustion gas within the main combustion chamber to keep the combustion gas from flowing into the auxiliary cylinder when the cylindrical side surface between the two compression rings is aligned with the opening of the auxiliary cylinder;
   the main combustion chamber and the auxiliary passage adapted to communicate with each other through the cavity when the actuator shifts the slidable valve body to a position where the first-mentioned port faces the cylinder opening; and
   the valve body, the two compression rings, the cavity, and the actuator adapted to be an elements of the slidable valve.

4. A piston engine as claimed in claim 3, the engine having a slidable valve and being characterized by the main combustion chamber and the auxiliary passage communicating with each other through the cavity during a suction stroke.

5. A piston engine as claimed in claim 3, the engine having a slidable valve and being characterized by:
   the second port formed in another part of the cylindrical side surface than the part of the cylindrical side surface that lies between the two compression rings;
   the auxiliary cylinder having a second opening facing the second port when the first-mentioned port faces the first-mentioned opening; and
   the auxiliary passage being adjacent to the second opening.

6. A piston engine as claimed in claim 2, the engine having a slidable valve and being characterized by:
   the actuator being pneumatic, hydraulic, electromagnetic, or electric;
   an apparatus including a cam and a device for changing the phase of the cam; and
   the pneumatic, hydraulic, electromagnetic, or electric actuator interposed between the slidable valve body and the cam.

7. A piston engine as claimed in claim 2, the engine having a slidable valve and being characterized by the cavity having a second port formed in the part of the cylindrical side surface that lies between the first and third compression rings, the second port being opposite to the first-mentioned port radially of the auxiliary cylinder.

8. A piston engine as claimed in claim 4, the engine having a slidable valve and being characterized in that the strokes of the piston of the engine are not shorter than the diameter of the piston.

9. A piston engine as claimed in claim 2, the engine having a slidable valve and being characterized by:
   the slidable valve body being a cylindrical sleeve;
   the cavity port formed in another part of the cylindrical side surface than the part of the cylindrical side surface that lies between the first and second compression rings;
   an upper fixed part and a lower fixed part both fitted in the sleeve;
   the upper and lower fixed parts fixed to a cylinder head and a cylinder block respectively;
   other compression rings fitted on the upper and lower fixed parts;
   the upper and lower fixed parts defining a space therebetween in the sleeve, the space being used as the cavity; and
   a second ignition plug fitted to one of the upper and lower fixed parts.

* * * * *